(12) United States Patent
Russell

(10) Patent No.: US 11,603,651 B2
(45) Date of Patent: Mar. 14, 2023

(54) DISTRIBUTED UTILITY SYSTEM

(71) Applicant: Matthew F. Russell, Spokane, WA (US)

(72) Inventor: Matthew F. Russell, Spokane, WA (US)

( * ) Notice: Subject to any disclaimer, the term of this patent is extended or adjusted under 35 U.S.C. 154(b) by 218 days.

(21) Appl. No.: 16/974,176

(22) Filed: Nov. 2, 2020

(65) Prior Publication Data

US 2021/0087803 A1 Mar. 25, 2021

Related U.S. Application Data

(63) Continuation-in-part of application No. 16/501,690, filed on May 22, 2019, now Pat. No. 10,865,547.

(51) Int. Cl.
| | |
|---|---|
| *E03F 1/00* | (2006.01) |
| *H04B 7/14* | (2006.01) |
| *H04B 10/2575* | (2013.01) |
| *E03F 3/02* | (2006.01) |
| *H04B 7/155* | (2006.01) |

(52) U.S. Cl.
CPC .............. *E03F 1/002* (2013.01); *E03F 1/001* (2013.01); *E03F 3/02* (2013.01); *H04B 7/14* (2013.01); *H04B 7/15507* (2013.01); *H04B 10/25752* (2013.01)

(58) Field of Classification Search
CPC .. E03F 1/002; E03F 1/001; E03F 3/02; H04B 7/14; H04B 7/15507; H04B 10/25752
USPC ...................................... 340/286.01
See application file for complete search history.

(56) References Cited

U.S. PATENT DOCUMENTS

| | | | |
|---|---|---|---|
| 2007/0081773 A1* | 4/2007 | Pizzorno ................. | G01K 11/32 385/100 |
| 2013/0055650 A1* | 3/2013 | Hartmann ............... | E03B 7/095 52/124.1 |
| 2013/0168041 A1* | 7/2013 | Teron ..................... | F24F 5/0089 165/49 |
| 2015/0308128 A1* | 10/2015 | Mullaney .................. | E04B 1/40 52/220.1 |
| 2019/0342945 A1* | 11/2019 | Khemakhem ........ | G02B 6/3897 |

* cited by examiner

*Primary Examiner* — Kerri L McNally
(74) *Attorney, Agent, or Firm* — John S. Reid

(57) ABSTRACT

A distributed utility system includes water source supply lines capable of being placed in fluid communication with a separate water source, water discharge lines capable of being placed in fluid communication with a separate water discharge destination, a water source and destination control manifold to allow selected water source supply lines to be placed in fluid communication with selected water discharge lines, and a storm water collection and distribution system. The storm water system includes a storm water collection conduit and a collected storm water discharge line in fluid communication with the storm water collection conduit, and the storm water discharge line can be placed in fluid communication with the plurality of water discharge lines via the control manifold. The distributed utility system further includes a utility line disposed within at least one of the water source supply lines, water discharge lines and collected storm water discharge line.

5 Claims, 11 Drawing Sheets

DISTRIBUTED UTILITY SYSTEM

CROSS REFERENCE TO RELATED APPLICATION(S)

This application is a continuation-in-part of U.S. patent application Ser. No. 16/501,690, filed May 22, 2019, which is hereby incorporated herein by reference in its entirety.

BACKGROUND

Cities and towns (which include water-impermeable hardscapes such as streets, roofs, parking lots, etc.) typically have different and various ways to handle the collection, treatment and release of sewage, storm water and other urban runoff (i.e., runoff water from driveways, parking lots, etc.). In some districts sewage and storm water are treated in a common facility. However, more modern systems provide for the separate collection and treatment of sewage and storm water (including other urban runoff water). Following treatment to an acceptable environmental level, water from sanitary sewers and urban runoff (including storm water) are typically released to the environment, and this is where there can be considerable variation from one district to another. For cities and towns located near bodies of water (such as rivers, oceans, bays, large lakes, etc.) it is common to discharge treated effluent and storm water to the body of water. In locations where this is not feasible (or not allowed for environmental reasons) the treated water can be discharged to an evaporation pond, used for crop irrigation, or pumped into an aquifer or underground storage reservoir.

A common trait of most sewage and storm water management systems is that they only provide one configuration for managing the collection, treatment and discharge of the water. This kind of one-system-for-all-conditions arrangement does not result in the best use of the discharged water at all times, as conditions can change depending on the weather, the season, and other factors.

Additionally, most storm water collection systems necessitate that the collected storm water be separately treated to remove contaminates (such as suspended solids, phosphates, ice-melters, and oil) prior to being discharged.

DETAILED DESCRIPTION

Figure 1:
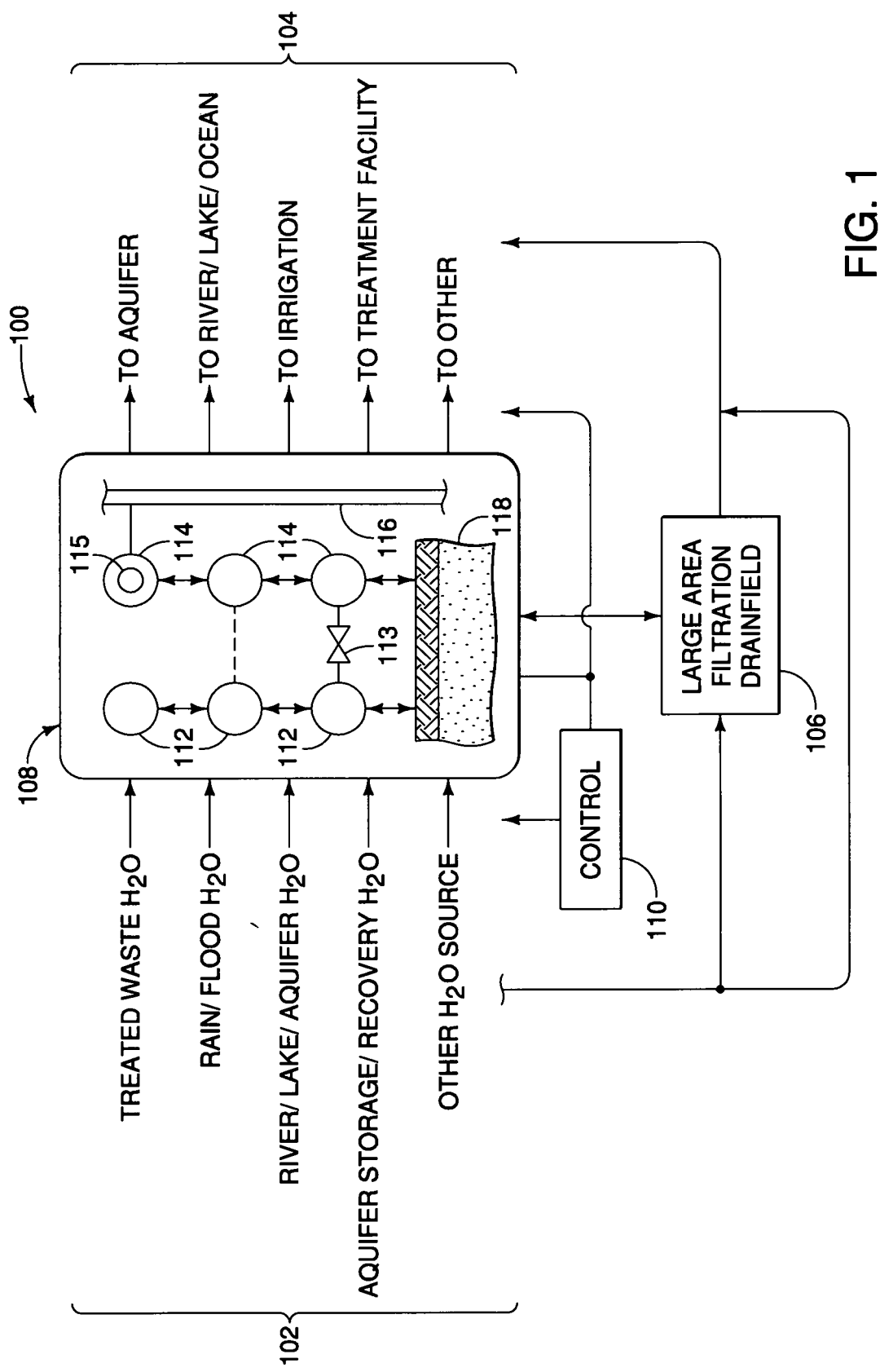
FIG. 1 is a schematic diagram depicting the general elements of a distributed integrated water management system according to the present disclosure.

The present disclosure provides for a distributed integrated water management system for the collection, treatment and discharge of sewage and storm water, as well as other urban runoff. The water management system provided for herein allows for flexibility in selecting the current-best-use for the discharged water, managing water distribution over a large area, and managing urban storm water during storms. The present disclosure also provides for localized water filtration systems for storm water, thus reducing (or even eliminating) the need to separately collect and treat storm water prior to discharge to the environment. (As used herein, "storm water" may also be referred to as "stormwater".)

As indicated above, current systems for handling the discharge of treated waste water and storm water (including ancillary urban runoff) are limited in that they typically only provide for a single destination for the treated water. This does not always result in the best use of the discharged water. For example, if treated water is discharged to a river, then discharging the treated water during low-water level conditions to the river can be beneficial (for example, by providing water for subsequent downstream use, or facilitating fish breeding). However, if the water is discharged to a river during high (river) water level conditions, then the discharged water is essentially wasted (i.e., it ends up in the ocean without providing any benefit). In fact, discharging treated water to a river during high level river conditions can actually be detrimental by contributing to potential downstream flooding and erosion of river banks. Moreover, by discharging treated water to a waterway where it offers no benefit, the water is deprived of being used for other beneficial purposes. For example, where municipal water is drawn from an aquifer, it would be desirable to return treated water to the aquifer in order to replenish the aquifer, and in particular if discharging the water to a waterway adds no benefit to the waterway. It is already known to discharge treated water to an aquifer, but if this is the only option provided for discharging treated water, then the water cannot be used for purposes such as crop irrigation (without having to pump the water back out of the aquifer). A fully integrated water management system (as provided for herein) allows for the best-use of collected water (including wastewater and stormwater), and a large degree of flexibility in disposing of collected water. This can include managing stormwater to reduce flooding during exceptional rainfall events.

A disadvantage of current water handling systems that provide for separate sewage water treatment and storm water treatment is that such systems require large holding tanks or ponds for the collected storm water. In an urban environment underground storm water collection tanks are preferable to surface ponds and swales, since the tanks are not using valuable surface area which can otherwise be used for residential and commercial purposes. Additionally, surface ponds and swales can be essentially useless in freezing weather, and can be a breeding ground for insects in warm weather. However, underground storm water collection tanks are expensive to install, and are limited in how much water they can hold—the limit typically being imposed economically (i.e., the cost to install holding tanks to address extraordinary storm events can easily exceed the estimated costs of damage due to the storm events). In the event of a truly significant rain (storm) event, these storage tanks can be overwhelmed, thus resulting in flooding or discharge of excess storm water to the sewage treatment system, a body of water, or a river. Further, in existing systems which do not provide for the separate handling of sewage water treatment and storm water treatment, the water treatment facility (which process both sources of water) typically includes large surge tanks in order to accommodate storm water surges. In extraordinary storm events, these surge tanks can easily become overwhelmed, thus requiring the release of untreated water (sewage and stormwater) to a river, bay, etc., or even bypassing the stormwater collection tank(s) altogether. These situations are where the localized storm water filtration system provided for herein can become useful—i.e., in eliminating (or reducing) the need for large underground storm water collection tanks and/or surge tanks, or at the very least allowing for the reduction in size of such tanks. That is, the present disclosure provides for a water management system which allows for excess storm water to be moved away from a region where it would otherwise need to be collected by storm and surge tanks to a region where the excess storm water can be discharged to a natural formation (such as an aquifer). The present disclosure further provides for a filtration system to filter such excess storm water prior to being discharged to the natural formation.

In a typical urban region there exists an urban core and an outlying suburban region, and beyond the outlying suburban region a rural region. The urban core of an urban region is typically covered by streets, buildings, parking lots, and other features which preclude the natural migration of storm water into subsurface features (such as migration into a subsurface aquifer). The outlying suburban region of an urban region typically offers more opportunities (e.g., lawns, parks, etc.) for the migration of storm water into subsurface features (such as an aquifer), and outlying rural areas (such as farmland and undeveloped land) offer even greater opportunities for the migration of storm water into subsurface features. The present disclosure provides for a system to move storm water from an urban core to a suburban region where the storm water can be discharged to a natural formation, and (if necessary) from the suburban region to a rural area (or even beyond) where the storm water can discharged. It will be appreciated that the storm water management system provided for herein accomplishes two beneficial objectives: (i) excess storm water can be moved away from an urban core to thus reduce the need for storm water collection tanks within the urban core; and (ii) storm water moved away from an urban core can be discharged to a natural formation (such as an aquifer). It will be appreciated that a preferable destination for the discharge of water from an urban core (and a surrounding suburban region) is to replenish a regional aquifer. It will also be appreciated that, prior to discharging any such water to an aquifer, the water should preferably first be filtered to remove contaminates. To this end, the present disclosure provides for filtration beds disposed between the urban-core storm water collection sumps and the final discharge location of the storm water (or indeed, any urban runoff water) in order to reduce contaminants from the urban runoff areas from being introduced into the final discharge location (such as an aquifer).

Further, urban cores and suburban regions of urban areas are typically connected by sewage lines which allow sewage from the suburban regions to be moved to, and processed by, a sewage treatment facility which also processes sewage from the urban core. The present disclosure provides for using such sewage lines as a conduit for movement of storm water from an urban core to an associated suburban region, by placing storm water distribution lines within existing sewage lines. Such an arrangement allows for the economic use of existing sewage lines to move storm water outward from an urban core. That is, a sewage line can be used to move sewage inward from a suburban area to a sewage treatment facility near an urban core, and can also host a separate storm water discharge line to move storm water outward from the urban core to a discharge location away from the urban core. More generally, the present disclosure provides for installing a small diameter pipe within a large diameter pipe to simplify installation of the small diameter pipe. One example is installing a nominal 6 inch diameter pipe within a 30 inch diameter pipe. The respective cross-sectional areas of the two pipes are 707 in-sq (large pipe) and 28 in-sq (small pipe), such that introducing the small pipe into the large pipe (in this example) reduces the cross-sectional area of the large pipe by only 4%. Examples of large diameter pipes can include sewage collection and disposal lines, water supply lines, storm water distribution lines, etc. Examples of the small diameter pipes can include local runoff water collection and distribution lines, potable water distribution lines, etc. Further, the small diameter pipe can be provided with nozzles such that water from the small pipe can be used to flush accumulated debris and the like from the large pipe. This arrangement will be described more fully below.

With reference to the accompanying drawings, FIG. 1 is a schematic diagram of a distributed integrated water management system 100. The system 100 includes a plurality of water sources (102) (which are ultimately to be discharged), a plurality of discharge destinations (104), a large area filtration drain field (106), a municipal storm water collection and distribution system (108), and a control system (110). Each of the components of the distributed integrated water management system 100 will now be described.

As indicated in FIG. 1, the plurality of water sources (102) to be discharged can include treated waste water (e.g., treated sanitary sewer effluent), storm water (such as from rain and/or flooding), water from a natural body of water such as a lake, a river or an aquifer, water from an aquifer storage and recovery system, and other sources of water (such as from a surge tank and/or a storm water collection tank). The other sources of water can include non-storm urban runoff such as snow melt, street washing, and landscape irrigation runoff. It will be appreciated that the water sources 102 indicated in FIG. 1 are exemplary only, and that any system 100 can include some or all of the indicated water sources. It will also be appreciated that the water sources 102 are not necessarily treated waste water. For example, as indicated, the source water can be water from an aquifer or from surface waters (e.g., during floods). This allows flexibility in the system 100—i.e., to route water from any desired source (102) to any desired destination (104).

The possible water destinations (104) depicted in FIG. 1 exemplarily include an aquifer, a body of water (e.g., river, lake, ocean, etc.), irrigation (e.g., crops or parks), treatment facilities, and other desired possible destinations. Examples of treatment facilities can include facilities for the removal of solids and chemicals (including oil, phosphates and ice melters), and treating to remove pathogenic organisms. As with the water sources 102, the water destinations 104 depicted in FIG. 1 are exemplary only, and the system 100 can include only some of the destinations indicated, as well as other destinations not specifically indicated.

The large area filtration drain field (106) of the system 100 of FIG. 1 is an optional component which can be used to introduce storm water (and other water) to an aquifer, as will be described in more detail below with respect to FIG. 5.

The municipal storm water collection and distribution system (108) of the distributed integrated water management system (100) of FIG. 1 is primarily used to collect, filter and distribute urban surface runoff water, such as storm water, flooding, and other urban water (such as from street washing, and lawn irrigation, for example). The term "storm water" will be used herein to refer to all forms of surface water which flows from hardscapes (such as streets, sidewalks, parking lots, houses, buildings, etc.), including rain, snow melt, and excess irrigation. The municipal storm water collection and distribution system (108) includes a plurality of static sumps (112) that can be used to capture urban runoff, and a plurality of dynamic sumps (114) that can capture and discharge urban runoff. The dynamic sumps (114) are provided with a pump (115, only one of which is depicted in FIG. 1), thus allowing the dynamic sumps to be pumped out to a water discharge conduit (116). The static sumps (112) are preferably fluidically connected to one another to allow flow from one static sump to another, thus distributing collected urban runoff and maximizing the water storage capabilities of the collection of static sumps. Likewise, the dynamic sumps (114) can be fluidically connected to one another. Further, the static sumps (112) can be placed in fluid communication with the dynamic sumps (114) either by direct connection (as shown by the dashed line), or selectively such as by a valve (113) (or gate) placed in a fluid line (e.g., a canal) connecting the two types of sumps. The municipal storm water collection and distribution system (108) further includes a localized runoff water filtration system 118, through which the urban runoff can flow prior to entering the sumps (112 and/or 114). Additional details of the sumps (112, 114) will be provided below with respect to FIGS. 4, 10 and 11, and further details of the localized runoff water filtration system (118) will be provided below with respect to FIGS. 2, 3 and 10.

The control system (110) of the distributed integrated water management system (100) of FIG. 1 allows selected sources of water (102) to be selectively directed to one or more water destinations (104), as well as management of the municipal storm water collection and distribution system (108) by selectively opening and closing of valves, and actuation of pumps (e.g., 115). The control system 110 can include manual controls (e.g., manually operated valves) as well as automatic controls (e.g., actuation of sump pumps (115) by a high level switch). The control system (110) will be described in more detail below with respect to FIGS. 7 and 8.

It will be appreciated from FIG. 1, and the above description of the components thereof, that the system 100 is a distributed system, in that the water sources (102), as well as the water destinations (104), can cover a large area—for example, local waterways adjacent to a city, outlying crop lands (for irrigation), and distant aquifers and the like. An example of a regional area where such a system (100) can be employed is the San Francisco Bay area, where there are a collection of cities in close proximity to one another, a nearby ocean, a bay, an estuary, the more distant Sacramento River, the even more distant California Aqueduct system, and a somewhat distant underground aquifer, all of which can variously be used in the system 100. For example, treated urban runoff water from the San Francisco area cities (which can be initially collected and processed by the municipal storm water collection and distribution system 108) can be routed to the California Aqueduct, and likewise water from the California Aqueduct can be routed to a large area drain field (106) to replenish the underground aquifer. It will further be appreciated that the system 100 of FIG. 1 is an integral system in that the various water sources (102, including the urban runoff system 108) and water destinations (104, including drain field 106) are capable of being placed into selective communication with one another, versus being separate systems (i.e., the traditional prior-art separate and isolated storm water and treated effluent systems).

Figure 3:
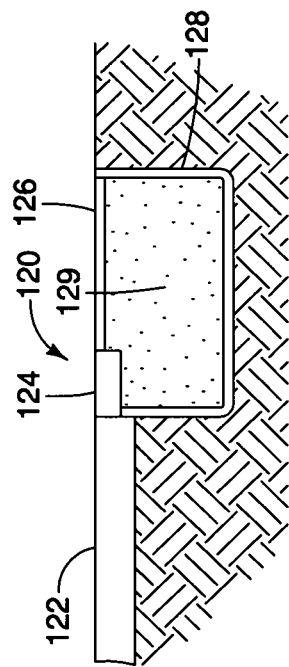
FIG. 3 is a side sectional view of the localized storm water filtration system depicted in FIG. 2.
Figure 2:
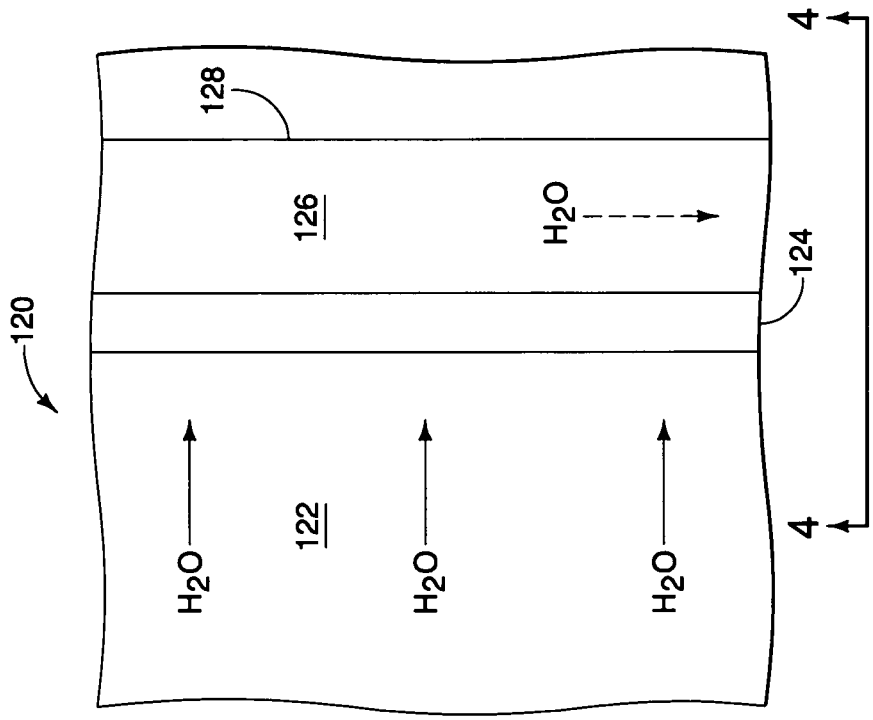
FIG. 2 is a partial plan view depicting a localized storm water filtration system.

Turning now to FIG. 2, a localized (typically, urban) water runoff collection and filtration system 120 is depicted in a plan view. FIG. 2 will be discussed in conjunction with FIG. 3, which is a partial side sectional view of the urban water runoff collection and filtration system 120. The urban water runoff collection and filtration system 120 is preferably placed adjacent to an essentially water impermeable surface covering 122, such as an asphalt street or parking lot, or a concrete sidewalk or driveway. The urban water runoff collection and filtration system 120 includes a hard water-permeable surface covering 124, and beneath that a water permeable filtration bed 129 (FIG. 3). The water permeable filtration bed 129 can be placed within a water impermeable conduit or swale 128, with the water permeable surface covering 124 placed (at least partially) on top. The storm water collection swale (or storm water collection conduit) 128 can also be partially covered by a water-impermeable covering 126, such as cement, tiles, or asphalt. Urban runoff (including storm water) from the impermeable surface covering 122 flows by gravity to the water permeable surface covering 124, and from there into the filtration bed 129. From the filtration bed (129), the filtered urban runoff water can be directed to the static sumps (112) and/or the dynamic sumps (114) of the urban runoff water collection system (108, FIG. 1). The water permeable covering (124) placed over the swale (128) can be, for example, water permeable tiles. Examples of water permeable tiles that can be used for the water permeable covering (124) are provided for in U.S. Pat. No. 9,943,791. The water permeable filtration bed (129) is preferably a bed of mineral particles than can filter out particulate from the urban runoff water. The water permeable filtration bed (129) can be configured as a traditional layered filter, having a course sand or gravel upper layer, and one or more lower layers of finer grained sand, including porous sand. An example of porous sand that can be used as at least part of the water permeable filtration bed (129) is provided for in U.S. Pat. No. 10,106,463. The water permeable filtration bed (129) can also include additional components such as activated charcoal, carbonate rock and/or mineral oxides (for the removal of phosphates, for example), and oil absorbing particles (not shown in FIG. 3). The urban water runoff collection and filtration system (120) can be easily maintained (e.g., to account for eventual clogging of the filtration bed 129) by removing the swale covering components (permeable surface covering 124, and impermeable surface covering 126) and replacing the filtration bed (129). The filtration bed 129 can be provided in a modular fashion, such as compartmentalized contained units of filtration material which can be removed (once spent) and replaced with fresh compartmentalized contained units (e.g., 1000 lb contained sacks of filtration material, each encased within a fluid permeable covering).

With respect to FIGS. 2 and 3, it will appreciated that the placement of the urban water runoff collection and filtration system 120 is such that the filtration bed (129) is preferably disposed away from areas of heavy road traffic which can impose compactive forces on the filtration bed, thus potentially compromising the effectiveness of the filtration bed. For example, in an urban core the urban water runoff collection and filtration system 120 can be placed beneath a parking strip at an outermost edge of a street, as opposed to being placed beneath a sidewalk, since existing infrastructure beneath a sidewalk can require substantial modification in order to accommodate the urban water runoff collection and filtration system 120. In a suburban environment, more latitude can be provided for placement of the urban water runoff collection and filtration system 120.

It will be appreciated that storm water (or urban runoff water) may need to be further treated by an urban runoff water treatment facility (see fourth-down item in water destinations 104, FIG. 1, as well as item 162, FIG. 8, discussed below) prior to being discharged to an aquifer or a natural body of water (e.g., lake, river, estuary, bay, etc.). Urban runoff water can include suspended solids (such as dust and other solids), oil and grease (from streets and the like), as well as chemicals (such as ice melters and phosphates). Such water treatment facilities for the treatment of collected urban runoff (prior to discharge) can thus include: (i) a particulate filtering system; (ii) a flocculator to remove suspended solids which are smaller than the permeable pores of the filtration medium; (iii) an oil and grease removal system; (iv) a salt precipitator (or desalination system), and (v) active minerals (such as mineral oxides, mineral carbonates, and charcoal, for example) to remove chemicals (such as phosphates). Typically urban runoff does not need to be treated for the removal of biological agents, but a treatment facility to address this issue can also be provided for. Further, since the urban area (not numbered) covered by FIG. 1 can include industrial areas (e.g., manufacturing sites, bulk material handling and storage sites, and rail yards) such sites (which are typically located in specifically zoned industrial areas, such as harbors, piers, industrial parks, etc.) can include specifically selected water treatment facilities to address potential surface contamination of runoff water resulting from the activities at a given industrial site. That is, the runoff water from industrial sites can be pre-treated in a separate facility prior to being introduced to the water collection and distribution system (108, FIG. 1).

Figure 4:
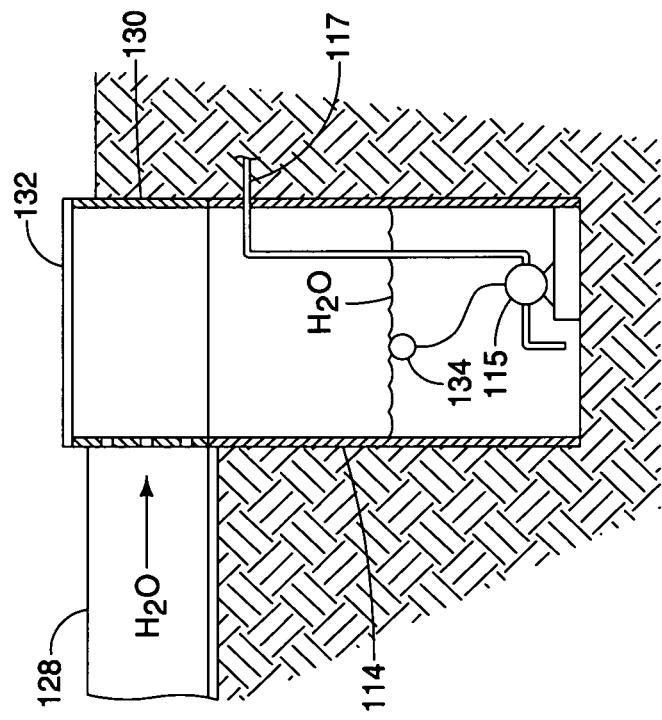
FIG. 4 is a side sectional view of a dynamic sump system that can be used in conjunction with the localized storm water filtration system of FIG. 2.

Turning now to FIG. 4, an example of a dynamic sump 114 (per FIG. 1) is depicted in a side sectional view. The sump (114) can also be described as a cistern. The sump (114) can be formed as a cement cylinder (with the cylindrical axis being oriented essentially vertically), and is preferably placed below grade. The sump 114 can be also be formed in other forms (such as polygon), and from other materials (such as fiberglass). The sump 114 can be provided with a perforated crown 130 (also preferably located at least partially below grade) which allows urban runoff water from the swale 128 (see also FIG. 3, described above) to flow into the sump (114). The perforated crown (130) can be covered by a removable manhole cover 132 to allow servicing of the sump (114) and components placed therein. In the example depicted in FIG. 4 the sump (114) has an open lower end, thus allowing collected urban runoff water to percolate into the ground. However, the sump (114) can also be provided with a water impermeable bottom if it is not desirable to have water from the sump percolate into the ground. Similarly, the wall material of the sump 114 (i.e., the material defining the vertical height of the sump) can be a water-permeable material or a water-impermeable material, depending on whether or not it is desirable to have water from the sump (114) percolate into the surrounding area (in the case of a water-permeable sidewall material), or be restrained within the sump (in the case of a water-impermeable sidewall material).

The dynamic sump (114) of FIG. 4 is provided with a sump pump 115 which can be automatically actuated by a level switch (such as a float switch 134). The sump pump 115 can be configured to discharge water which is collected within the sump (114) via the discharge line 117, which can be routed to one or more discharge destinations (e.g., any of 104 and 106, FIG. 1). It will be appreciated that the static sumps (112) of FIG. 1 can be generally the same as described above for the dynamic sump 114, with the exception that the static sumps (112) do not include a pump for pumping the sump. Thus, the static sumps (112) can drain by having an open bottom in fluid communication with the ground to allow water from the sump to percolate into the ground, as well as by overflowing into a dynamic sump (114) from which the water can be pumped-out by virtue of a sump pump (115). As indicated in FIG. 1, static sumps (112) can be in fluid communication with one another (e.g., a cascading gravity overflow arrangement, as described below with respect to FIG. 10), and can also be in fluid communication with one of more dynamic sumps (114).

The perforated crown 130 of FIG. 4 (also referred to as the perforated ring in FIG. 10, below), is but one example of an apparatus which can be used to allow collected runoff water to enter the sumps (112, 114, FIG. 1). Perforated cast cement rings are common known components used in storm water collection systems. However, since in the embodiments described herein the collected runoff water is generally intended to be passed through a water permeable filtration bed (e.g., 129, FIG. 3) prior to entering the sumps, other types of perforated crowns may be desirable. For example, the perforated crown 130 can be provided with openings that are covered by a metal mesh screen in order to reduce the migration of particles from the filtration bed (129, FIG. 3) from entering the sumps (112, 114, FIG. 1) through the perforated crown. Further, during installation the perforated crown (130) can be surrounded by fine gravel and/or sand in order to reduce the migration of finer particles into the associated sumps.

Figure 10:
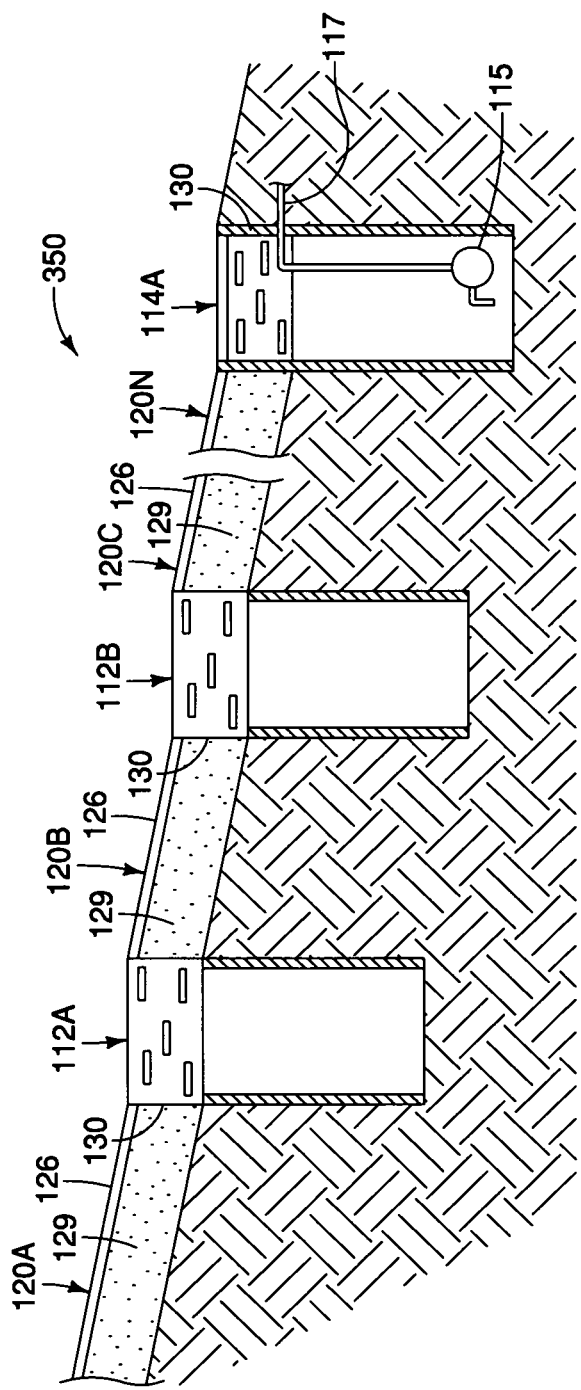
FIG. 10 is a sectional side view diagram depicting how static sumps of the present disclosure can be arranged in a cascading arrangement.

FIG. 10 is a side view sectional diagram depicting how the sumps 112, 114 of FIG. 1 can be placed in a cascading arrangement 350. The cascading arrangement 350 of sumps depicted in FIG. 10 includes two static sumps (112A, 112B) and a dynamic sump (114A). The broken line between sumps 112B and 114A indicate that additional static sumps (112) can be placed before the dynamic sump 114A. Each sump (112A, 112B, 114A) is topped by a perforated crown 130 which allows water to enter the respective sump. In the case of the static sumps (112A, 112B), the perforated crowns 130 also allow water to exit the sumps by overflowing from the perforated crowns. As depicted in FIG. 10, the sumps (112A, 112B, 114A) are placed in a cascading arrangement, with sump 112A being oriented elevationally higher than sump 112B, and sump 112B being oriented elevationally higher than sump 114A. (The grade, or slope, between the sumps depicted in FIG. 10 is exaggerated in order to facilitate visualization of the arrangement.) In FIG. 10 sump 112A can be considered the highest most sump, while sump 114A can be considered the lowest most sump. Sump 112A is provided runoff water (such as storm water and the like) from a first urban water runoff collection and filtration system 120A (similar to the collection and filtration system 120 depicted in FIG. 3, and described above). The urban water runoff collection and filtration system 120A includes a surface covering 126 which covers the water permeable filtration bed 129. The surface covering can be water-impermeable (such as concrete or asphalt) or water-permeable (such as water permeable bricks which do not allow solids to migrate into the filtration bed 129). Similarly, a second urban water runoff collection and filtration system 120B is disposed between the first static sump 112A and the second static sump 112B. Once the first static sump 112A fills with water from the first water collection and filtration system 120A, the sump overflows (via the perforated crown 130) into the second water collection and filtration system 120B (due to gravity flow). Similarly, overflow of water from the second static sump 112B overflows into a third urban water runoff collection and filtration system 120C. Eventually, the last-in-line of the urban water runoff collection and filtration systems (here, depicted as 120N) flows into the dynamic sump 114A. Dynamic sump 114A can be arranged similarly to the dynamic sump 114 depicted in FIG. 4 and described above. Particularly, dynamic sump 114A is provided with a sump pump 115 which can pump collected water from the sump 114A to a water discharge line 117. While the sumps (112A, 112B, 114A) in FIG. 10 are depicted as all being of similar size (i.e., depth and width), the size of the sumps can vary—for example, the dynamic sump 114A can be larger than the static sumps (112A, 112B) since the dynamic sump can receive a large quantity of runoff water from the static sumps, as described below with respect to FIG. 11. In general, the volumetric capacity of the sumps in the cascading arrangement 350 can increase as the sumps decrease in elevation from sump 112A to sump 114A to account for the accumulated volume of water collected by the respective sumps.

Figure 11:
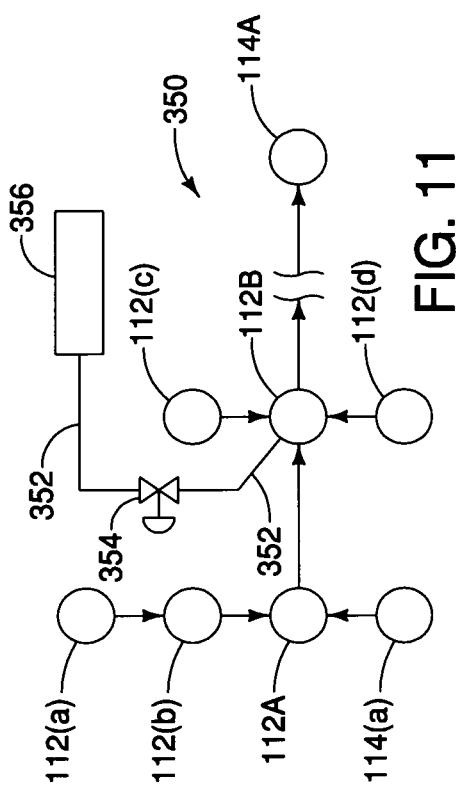
FIG. 11 is a plan view diagram depicting how the cascading arrangement of sumps depicted in FIG. 10 can be applied over a two dimensional surface area.

FIG. 11 is a plan view depicting how the cascading sump arrangement 350 of FIG. 10 can be expanded across a two-dimensional surface area (i.e., beyond the single inline arrangement of sumps depicted in FIG. 10). FIG. 11 depicts the two static sumps (112A, 112B) of FIG. 10, as well as the dynamic sump 114A. As depicted in FIG. 11, static sump 112A can receive overflow water from collateral static sumps 112(a) and 112(b), and collateral dynamic sump 114(a). Similarly, static sump 112B can receive overflow water from collateral (or secondary) static sumps 112(c) and 112(d). The arrangement for communication of the collateral static sumps (e.g., 112(c) and 112(d)) with the associated main static sumps (112A, 112B) can be similar to the arrangement depicted in FIG. 10—i.e., a cascading gravity flow arrangement, with overflow water from the collateral sumps passing through a water filtration bed (see 129, FIGS. 3 and 10). As can be appreciated from the simplified example provided in FIG. 11, static sump 112A can receive overflow water from three collateral sumps (112(a), 112(b) and 114(a)), and dynamic sump 114A can ultimately receive overflow water from 6 other sumps. As indicated above, the size (i.e., depth and diameter) of each sump depicted in FIG. 11 can be adjusted in order to allow the sump to receive a total potential inflow volume of runoff water. That is, sumps which are located elevationally lower in the cascading arrangement 350 of FIG. 10 will typically be sized larger than elevationally higher sumps in order to accommodate the accumulated flow from the plurality of elevationally higher sumps in the cascading arrangement 350. During periods of high runoff (e.g., high flows of stormwater) the lowermost sump (114A) can potentially become overwhelmed with accumulated water from the other sumps in FIG. 11. In order to address this issue the sump system 350 can be augmented with water collecting and holding devices such as stormwater collection tanks, ponds, basins and drain fields. For example, in FIG. 11 sump 112B can be provided with the overflow line 352 which enters the sump below the crown 130 (FIG. 10), but near the upper end of the sump. The overflow line 352 can direct overflow water from the sump 112B to an overflow water receiving feature 356, which can be a pond, basin, drain field, tank, bayou, lake or other natural or manmade feature which can receive the overflow water from the sump 112B. Further, the overflow line 352 can include a control valve 354 which can be selectively opened when an overflow condition is present in the sump 112B. The control valve 354 can be operated manually, remotely, or via a high-level switch located within the sump 112B (such that when water in the sump 112B rises above a predetermined high level, the control valve 354 is opened, allowing overflow from the sump 112B to be directed to the water collection location 356). When the supplemental water collection location (356) is a storm water collection tank, for example, the tank can be provided with a pump (not shown) to allow the collected water to be directed back to the sump 112B once the high-flow condition has passed. By augmenting the sump system 350 with overflow water collection facilities (356), the end sump 114A can be sized to accommodate normal runoff water flow conditions, without having to be oversized to allow for abnormal flow conditions. Further, providing overflow water collection facilities can reduce the velocity of water flowing through the sump system 350 during high flow periods, which could otherwise potentially damage the system.

A particular advantage of the cascading sump arrangement 350 depicted in FIGS. 10 and 11 is that as water flows from one sump to the next in the cascading series, the water is filtered by a runoff water filtration bed (see 129, FIGS. 3 and 10). Depending on the number of sumps in the cascading arrangement, collected runoff water can be filtered multiple times before being discharged by the sump pump (115) in the dynamic sump (114A). For example, runoff water collected directly into collateral static sump 112(a) (FIG. 11) will ultimately be filtered at least 4 times before entering the dynamic sump 114A. As depicted in FIG. 11 (and not allowing for any additional sumps and filtration beds between static sump 112B and dynamic sump 114A), the collected runoff water ultimately entering the dynamic sump 114A will have been filtered on average 15/7 times (i.e., about 2.14 times—excluding water from the dynamic collateral sump 114(a), and assuming direct runoff water flows into the dynamic sump 114A from a water filtration bed). As can be appreciated, the more static sumps that are connected together in a cascading arrangement (as per 350, FIGS. 10 and 11), the greater will be the number of times that the water is filtered by a filtration bed prior to being discharged by a sump pump (115, FIG. 10). If two additional static sumps are inserted between static sump 112B and dynamic sump 114A in FIG. 11, then the number of filtrations from collateral sump 112(a) to dynamic sump increases to 6 filtrations. It will thus be appreciated that a cascading gravitational water flow arrangement of static sumps, separated by filtration beds between the sumps, can provide for an arithmetic increase in filtration of runoff water prior to discharge to a designated destination.

It will be appreciated that a further advantage of the sump arrangement 350 depicted in FIGS. 10 and 11 is that the system of sumps (112A. 112B, 114A, etc.) and connecting filtration systems (120A, 120B, etc.) form an essentially closed system to objects larger than fine particles. This is a distinction over other storm water collection and management systems which are essentially open and can thus collect trash, as well as become a habitat for pests (such as rats and the like).

Figure 5:
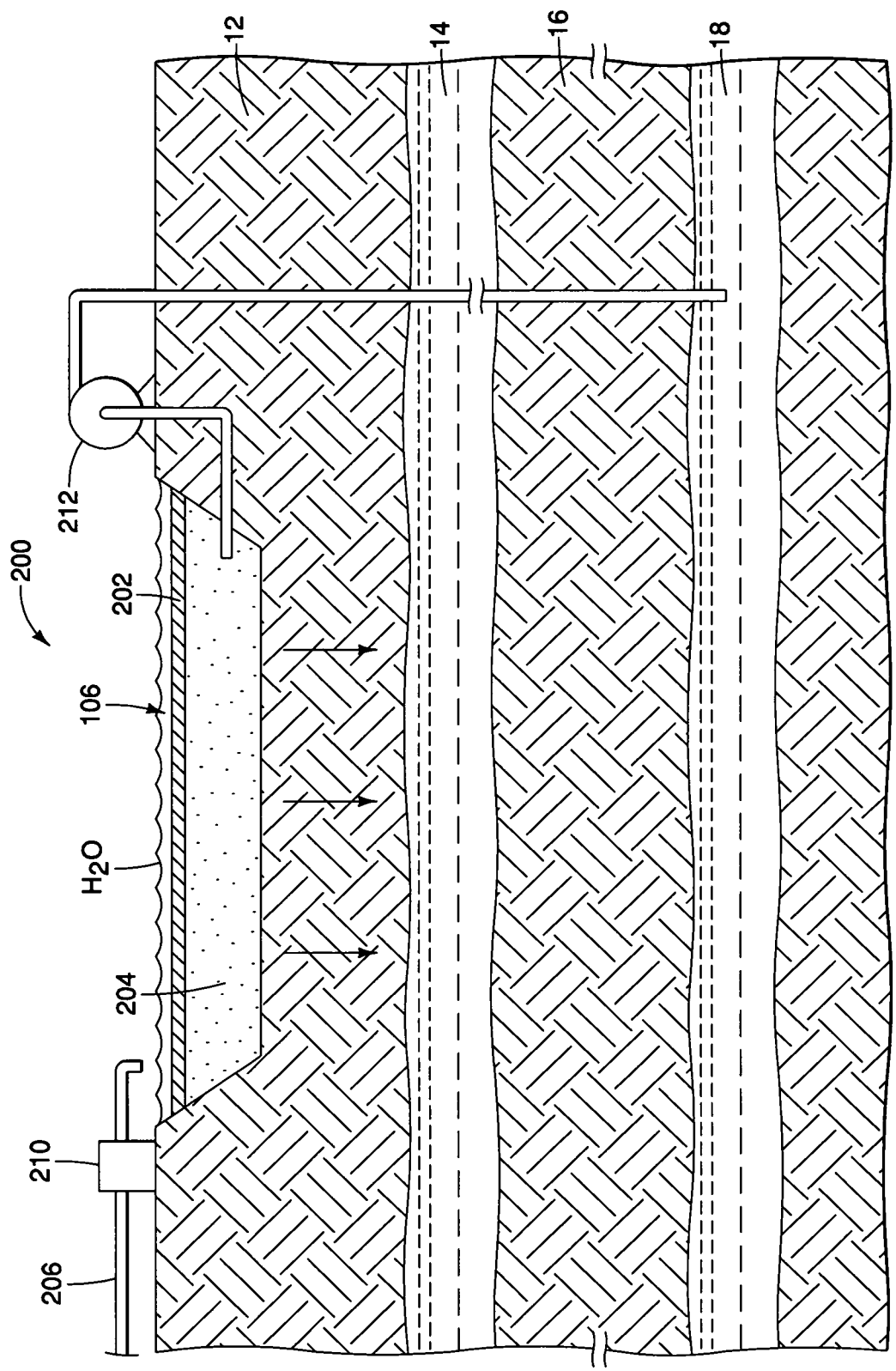
FIG. 5 is a side sectional view of a large area filtration drain system that can be used in the distributed water management system of the present disclosure.

FIG. 5 is a cross sectional schematic diagram depicting at least one configuration whereby storm water or treated water can be transferred to an aquifer. The aquifer replenishment system 200 of FIG. 5 includes a large area filtration drain field 106 (see also FIG. 1) which is placed within an upper ground layer 12. The drain field 106 can include a water-permeable surface covering 202 which is placed over a water-permeable filtration medium 204. The water-permeable surface covering 202 can be, for example, water-permeable tiles, such as the tiles 124 of the storm water collection system 120 described above with respect to FIGS. 2 and 3. Similarly, the water-permeable filtration medium 204 of the drain field 106 (FIG. 5) can be sand, gravel and other granular material similar to the filter material 129 described above with respect to the storm water collection system 120 (FIG. 3). The large area drain field 106 (FIG. 5) can be provided with water (such as collected storm water, or treated effluent) via a supply pipe 206 (or water discharge line 117 of FIGS. 4 & 10) which can discharge water onto an upper surface of the water-permeable surface covering 202. Prior to being discharged to the large area drain field (106) water from the supply line 206 can be treated in a water treatment facility 210. The water treatment facility (210) is depicted in FIG. 5 as a simple block, but can include one of more of: (1) a filtration system (including a flocculator); (2) a biological treatment system (to remove potentially harmful bacteria and the like); and (3) a chemical treatment system (e.g., for pH balance adjustment, metals removal, etc.). As depicted in FIG. 5, the aquifer regeneration system 200 can include a shallow aquifer 14, which can be replenished via natural percolation through the upper ground 12, and a deep aquifer 18. The deep aquifer (18) is separated from the shallow aquifer (14) via an intermediate ground layer 16, which can be permeable or impermeable. While in FIG. 5 the lower aquifer (18) is depicted as being located directly below the shallow aquifer (14), the lower aquifer (18) can in fact be at a different geographic location—i.e., remote from the shallow aquifer (14).

As further depicted in FIG. 5, the aquifer replenishment system 200 can further include a transfer pump 212. As depicted in FIG. 5, the transfer pump (212) is configured to draw water from the lower region of the large area drain field (106) and discharge the filtered water into the lower aquifer (18). Although not depicted in FIG. 5, the transfer pump 212 can also be configured to draw water from the shallow aquifer (14) and inject it into the lower aquifer (18). In another variation, the transfer pump (212) can be configured to draw water from the shallow aquifer (14) and inject it into the deep aquifer (18). Further, a plurality of these various pumping arrangements of the transfer pump 212 can be provided for by a piping and valve manifold (not shown in FIG. 5) which allows selection of the origin of the water which is to be pumped, and/or selection of the destination to which the water is to be pumped. An exemplary water manifold system 150 is depicted in the schematic diagram of FIG. 7, which will now be described.

Figure 7:
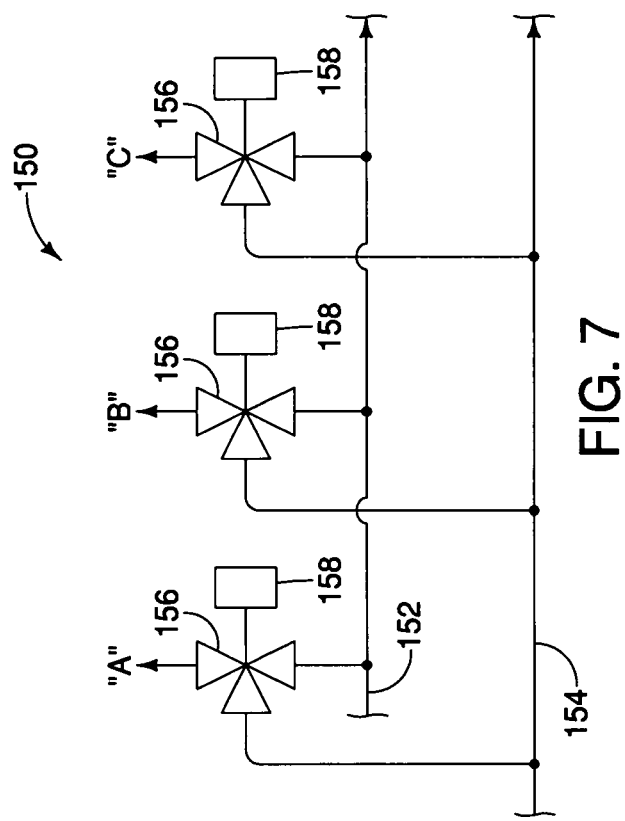
FIG. 7 is a schematic diagram depicting a treated-water selective-flow control manifold.

FIG. 7 is a schematic diagram of a water control manifold 150 which can be used in the integrated water management system (100, FIG. 1) of the present disclosure. The water source and destination control manifold 150 depicted in FIG. 7 (which is but one example of the control system 110 of FIG. 1) includes two water-source pipelines (152, 154), which can each be provided with water via one or more pumps (not shown in FIG. 7, but e.g., sump pump 115, FIG. 3). The water sources for the two water-source pipelines (152, 154) can be any of the water sources 102 of FIG. 1. The water-source pipelines (152, 154) are each connected to a plurality of three-way valves 156, which allow water from either source line 152 or 154 to be selectively directed to alternative outlets "A", "B" or "C", which can be any of the water destination outlets 104 of FIG. 1. The three-way valves 156 (FIG. 7) can be controlled by controllers 158, which enable the selective connection of water supply lines 152, 154 to the alternative outlets "A", "B" and/or "C". It will be understood that the three-way valves 156 can also be placed in a closed position by the controllers 158 such that no water is directed to the alternative outlets. While the control manifold 150 of FIG. 7 depicts only two water supply lines (152, 154) and three outlets ("A", "B" and "C"), it will be understood that additional water supply lines, and additional outlets, can be provided. When more than two water supply lines are provided, they can be selectively isolated from one another by separate valving (not shown) such that three-way valves (156) are sufficient to handle any number of water supply lines. The control manifold 150 of FIG. 7 allows an operator to select from a number of water source origins (e.g., 152, 154), and to direct water from any of those origins to any desired output destination (e.g., "A", "B", "C"). This allows efficient distribution of source water to a destination depending on then-existing conditions (e.g., discharge to a river during low water conditions, or to an aquifer when river water levels are high). The water control manifold 150 also allows for excess supply water (e.g., storm water) to be sent directly to a destination (e.g., an estuary or bay) with capacity to accommodate the excess water.

As can be appreciated from the above description of the water source and destination control manifold 150 depicted in FIG. 7, the water management control system 110 of FIG. 1 allows for the selective managed distribution of water from various water sources (102, FIG. 1) to various destinations (104), all dependent upon current circumstances. The water management control system 110 (FIG. 1) can include both automated managed (i.e., preprogrammed) distribution of water from water sources (102) to water destinations (104) based on pre-programmed algorithms, as well as human-determined distributions of source-water (102) to source-water destinations (104). While the software programming, and accompanying hardware for implementation for the same regarding automated distribution of water from a source (102) to a destination (104) are well within the scope of those skilled in the art (and thus not depicted in the accompanying drawings), it will be appreciated that (at this time) in certain circumstances only human intervention in determining the operation of the water management control system 110 is appropriate in order to achieve the desired result of the distribution of source water to a desired destination. The "valves" 156 of FIG. 7 can also be gates in a water system (e.g., gates in a dam, or gates allowing overflow into a bayou), thus allowing release of accumulated or directed water flow from one water source (or water-receiving source) to another water receiving destination, or to a water discharge location. This is a particularly useful advantage of the water management system of the current disclosure, in that it allows human intervention in order to direct influx water flow into the overall water receiving system to be directed to one or more discharge locations during an emergency situation. As one example, in the event of an oil spill outside of an estuary, water can be directed from the water sources (102, FIG. 1) directly to the estuary in order to reduce the incursion of oil from the spill from entering the estuary.

Figure 8:
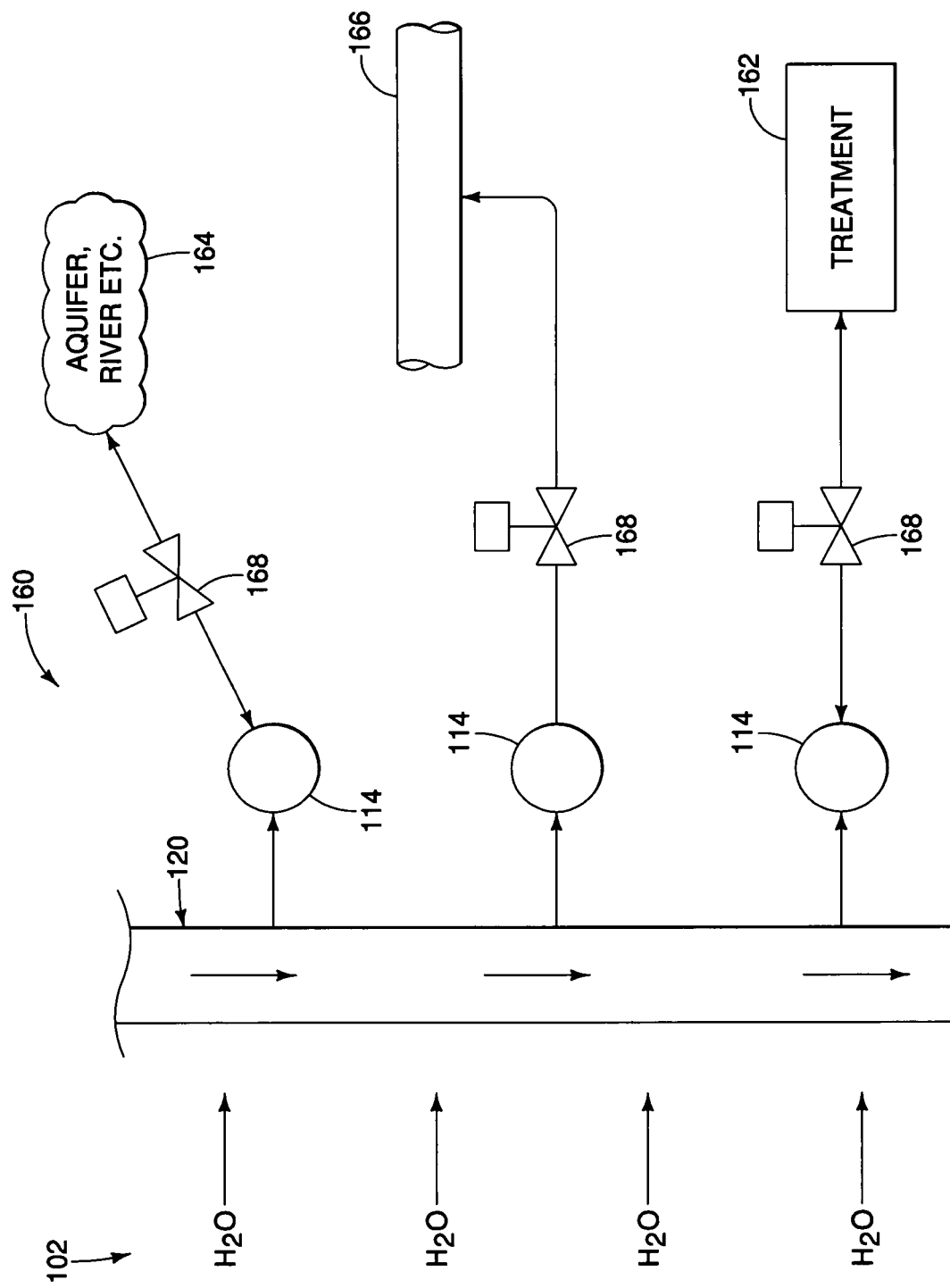
FIG. 8 is a schematic diagram depicting the integration of a localized storm water filtration system with a distributed water management system.

FIG. 8 is a plan view schematic diagram depicting a storm water collection and distribution system 160, with similar components as depicted in FIGS. 2-4 and described above. The storm water system 160 includes a water-permeable storm water collection and filtration system 120 (as described above with respect to FIGS. 2 and 3) which receives storm (and other) runoff water (left side of FIG. 8) from a water-impermeable surface covering (such as a street, parking lot, etc.). Collected and filtered storm water (and other runoff water) from the storm water collection and filtration system 120 flows by gravity into one or more of the dynamic sumps (114), and water from sumps 114 can be pumped (e.g., via sump pump 115, FIG. 4) to various destinations (e.g., aquifer/river 164, storm water transfer line 166, or to a water treatment facility 162). While FIG. 8 depicts the three dynamic sumps 114 as being separately connectable to the destinations 162, 164, 166 by valves 168, typically all of the sumps 114 will be attached to a common line (e.g., line 152, FIG. 7) which can be connected to a water destination control manifold (150, FIG. 7). Further, it will be appreciated that static sumps (112, FIGS. 1, 10 and 11) can be disposed between the filtration system 120 and the dynamic sumps 114 of FIG. 8. The various destinations (162, 164, 166) in FIG. 8 are basically depicted for the purpose of demonstrating that collected storm water (and other urban runoff water) can be directed to a plurality of different destinations, depending on existing conditions. Further, it will be appreciated that the sumps 114 in FIG. 8 can be in fluid communication with one another, as depicted in FIG. 1. A benefit of the storm water collection and distribution system 160 is that it can easily be expanded. For example, a city may elect to first install the system 160 in a city center area (urban core) where there is little water-permeable ground which can absorb storm water. The system 160 can then be extended outward to residential areas to collect storm water runoff from impermeable rooftops, driveways, streets and roads. Further, since the storm water collection and distribution system 160 includes the storm water collection and filtration system 120, there is less need for the collected storm water to be treated prior to be discharged to a destination (162, 164, 166). In particular, a storm water collection and distribution system which is applied to residential areas outside of a urban core can require less treatment of the collected storm water than for the same collected storm water in an urban core due to less intrusion of oil and other contaminants which are expected from the collection of storm water in the urban core. An additional benefit of the storm water system 160 is that it can make use of existing infrastructure to handle the discharge of collected storm water. One example of using existing infrastructure will now be described with respect to FIG. 6.

Figure 6:
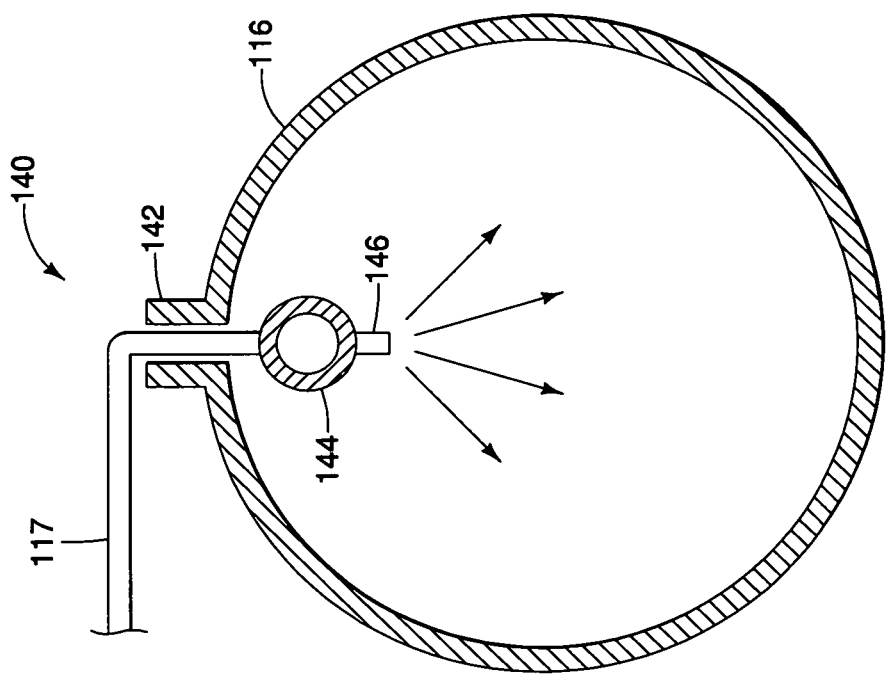
FIG. 6 is an end sectional view of a system that can utilize a large diameter pipe to house a smaller diameter pipe to simplify installation of the smaller diameter pipe.

Turning now to FIG. 6, a sewage collection flush system 140 is depicted in side sectional view. The sewage collection flush system 140 includes a sewage collection line 116, which can be connected to residential homes or the like for collection of sewage. The sewage collection line 116 is provided with a stub 142 which can receive a storm water discharge line 117 from a dynamic sump 114 (as depicted in FIG. 4 and described above). The storm water discharge line 117 (FIG. 6) enters the sewage collection line 116 via the stub 142, and is attached to a sewage flush line 144, which is placed within the sewage collection line 116. The sewage flush line 144 is provided with spray nozzles (146) such that the collected storm water is sprayed into the sewage collection line 116, thus facilitating flushing collected solids from the sewage collection line. In one variation, the sewage flush line 144 is replaced within a storm water distribution line (e.g., 166, FIG. 8), and in this way collected storm water can be directed (at least partially) to its ultimate destination without the need to excavate for the installation of the storm water distribution line. This concept (i.e., of placing a small diameter pipe within a large diameter pipe) can be extended to any large diameter pipe (e.g., a water supply line, or a pre-existing storm water collection line) to allow inexpensive installation of small diameter lines. For example, and as will be described further below with respect to FIG. 12, since these large diameter pipes connect urban areas with suburban areas, they can be used to house a collected storm water discharge line (144, FIG. 12) to move the collected storm water out from an urban core (302) to a suburban region (303) where the water can then be discharged to an aquifer reinfiltration system (such as depicted in FIG. 5 and described above).

As indicated above, the arrangement depicted in FIG. 6 can be generalized to include locating a first pipe (or fluid line) of a first diameter within a second larger pipe of a second (and larger diameter). Preferably the first (smaller) pipe has a cross sectional area which is about 15% or less of the cross sectional area of the larger diameter pipe. Further, the services of the two pipes, and the respective operating pressures, are preferably selected such that fluid from one line will not contaminate fluid in the second line. For example, if the larger diameter pipe is a sewage collection pipe, and the smaller diameter pipe disposed therein is a collected stormwater distribution line, it is desirable that sewage within the larger pipe be prevented from entering the smaller diameter stormwater line. This can be accomplished primarily by maintaining the pressure in the stormwater line (smaller diameter pipe) above that of the pressure in the sewage collection line (which normally operates at atmospheric pressure). It will be appreciated that the large diameter pipe can be any line which is part of an urban water and wastewater collection and distribution system. The arrangement depicted in FIG. 6, and described more generally herein, can greatly reduce the time and expense for the installation of the smaller diameter pipe when the larger diameter pipe is an existing (i.e., already-installed) pipe. Even when both pipes (i.e., the larger pipe and the smaller pipe) are part of a new installation, the arrangement of FIG. 6 can reduce the time and expense of installation since a smaller trench can be used to install only the larger diameter pipe (with the smaller pipe disposed therein), versus a larger trench needed to accommodate both lines separately.

In one variation of the configuration depicted in FIG. 6, the larger diameter pipe 116 can instead be a sump (e.g., sump 114 of FIG. 4, and thus considered as being viewed in horizontal cross section in FIG. 6), and the smaller diameter pipe 144 can be rotated 90 degrees (i.e., to at least partially transverse the cross-section of the sump). In this modified arrangement the nozzle 146 can be positioned to point towards the bottom of the sump, and can thus be used to flush accumulated solids from the bottom of the sump, thus allowing the solids to be pumped out of the sump (via pump 115, FIG. 4).

Figure 9:
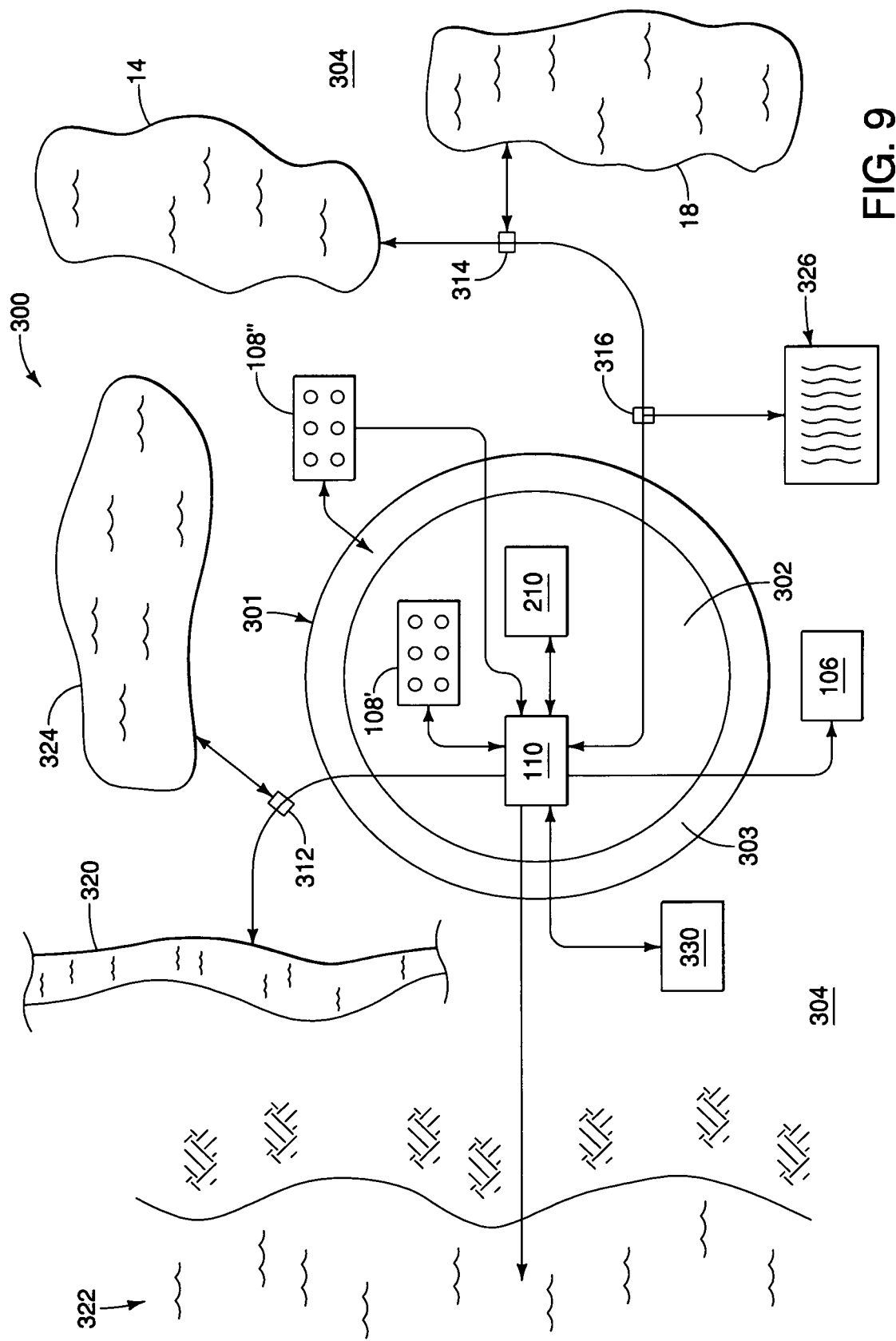
FIG. 9 is a plan view diagram depicting how the distributed integrated water management system according to the present disclosure can be applied over a large geographic area.

An exemplary model of a distributed integrated water management system 300 according to the present disclosure is depicted in FIG. 9, which is a plan view diagram depicting how the system can be applied over a large geographic area. It will be appreciated that the distributed integrated water management system 300 depicted in FIG. 9 represents but one example of a distributed integrated water management system within the scope of the present disclosure, and that other configurations of a distributed integrated water management system can also be provided for within the scope of the present disclosure. In the example depicted in FIG. 9, the large geographic area to which the water management system 300 applies includes an urban area 301, and an outlying non-urban area 304. The urban area 301 includes an urban core (302) and a suburban area (303). The urban core 302 can be defined by high-density buildings, road surfaces, and other structures which provide minimal surface area for natural drainage of water (including storm water) into subsurface water-receiving features. The suburban area 303 can be defined by housing, streets, sidewalks, parks, and other surface features which provide for some surface area for receiving natural drainage of water (including storm water) into subsurface water-receiving features, but may not be capable of absorbing all runoff from exceptional rain-water events into the subsurface water-receiving features. The outlying non-urban area 304, which extends beyond the urban area 301, can include such features as: (i) a bay or estuary (322); (ii) a river (320); (iii) a lake (324); a large area drain-field (106); (iv) a shallow aquifer 14 (see FIG. 5); (v) a deep aquifer 18 (see FIG. 5); and (vi) irrigated cropland 326. Central to the distributed integrated water management system 300 of FIG. 9 is the water management control system 110 which, as described above with respect to FIG. 1, allows for the selectively managed distribution of water from various water sources (e.g., 102 of FIG. 1, and e.g. 14, 18, 106, 320, 322, 324, 108', 108" of FIG. 9) to various water destinations (e.g., 104 of FIG. 1 and e.g. 14, 18, 106, 320, 322 and 324 of FIG. 9), all dependent upon current circumstances. It will be appreciated that, depending on circumstances, a "water source" (102, FIG. 1) and a "water destination" (104, FIG. 1) can be interchanged. For example, during a period of drought an aquifer (e.g., 14 or 18, FIG. 5) can be a water source, but during a period of excess rainfall the same aquifer can be a water destination. Accordingly, the water management control system 110 of FIGS. 1 and 9 allows for the selective direction of water from "water sources" (102, FIG. 1) to various "water destinations" (104, FIG. 1) according to current circumstances. As described above with respect to FIG. 7, the water management control system 110 of FIG. 9 can include an arrangement of multi-directional valves (156, FIG. 7) which allow for the selective direction of water from sources (102, FIG. 1) to destinations (104, FIG. 1).

With further reference to FIG. 9, the urban core 302 of the urban area 301 can include a central urban storm water collection and distribution sump system 108', which can be as described with respect to the municipal storm water collection and distribution sump system (108) of FIG. 1. Similarly, the suburban area 303 of the urban area 301 can include a suburban storm water collection and distribution sump system 108", which can also be as described with respect to the municipal storm water collection and distribution sump system (108) of FIG. 1. The distinction between the central urban storm water collection and distribution sump system 108', and the suburban storm water collection and distribution sump system 108", is that the storm water received by the central urban storm water collection and distribution sump system 108' may require additional treatment to remove contaminants (such as oil, phosphates and ice melters) beyond that required to treat storm water received by the suburban storm water collection and distribution sump system 108". Accordingly, it is appropriate that the water management control system 110 allow for selective direction of storm water from the urban storm water collection system 108', and the suburban storm water collection system 108", to a storm water treatment facility (e.g., 210, 330, FIG. 9).

As further illustrated in FIG. 9, collected waters can be treated by water treatment facilities (e.g., 210, 330) prior to being discharged to water destinations (104, FIG. 1). In the example provided in FIG. 9, water treatment facility 210 can treat collected storm water prior to being discharged to a regulated body of water (e.g., a river, aquifer, etc.), whereas water treatment facility 330 can treat collected municipal waste-water (including sewage) prior to discharge to a regulated body of water. Water treatment facilities 210 and 330 are provided in FIG. 9 in order to illustrate that different levels of water treatment are potentially appropriate, depending upon the source of the water to be treated. It will be appreciated that discharge lines from water treatment facilities 210 and 330 can be provided to allow for discharge to different destinations, but are not included in FIG. 9 for the sake of simplicity of the diagram. For example, water treatment facility 210 can discharge to river 320. It will also be appreciated that a water flow manifold (e.g., 150, FIG. 7) can be provided to allow for selective discharge of water from treatment facilities 210, 330 to various discharge destinations (e.g., any of 104, FIG. 1).

Further depicted in FIG. 9 are auxiliary distribution valves 312, 314 and 316, all of which can be under the control of the central water management control system 110. The auxiliary distribution valves 312, 314 and 316 are exemplary only, and serve to demonstrate how the central water management control system 110 can perform remote selective routing (and distribution) of water from sources to water destinations. More specifically: (i) auxiliary distribution valve 312 allows for selective sourcing and/or distribution between river 320 and lake 324; (ii) auxiliary distribution valve 314 allows for selective sourcing and/or distribution between shallow aquifer 14 and deep aquifer 18; and (iii) auxiliary distribution valve 316 allows for selective distribution between cropland irrigation 326, and diversion to aquifers 14 or 18. It will be appreciated that in addition to being remotely controlled from the central water system 110, the auxiliary distribution valves 312, 314 and 316 can also be operated manually at their specific locations. As can be appreciated from a review of FIG. 9, the water management system 300 can be expanded by adding additional water sources (including additional storm water collection systems such as 108'), as well as additional water destinations.

Figure 12:
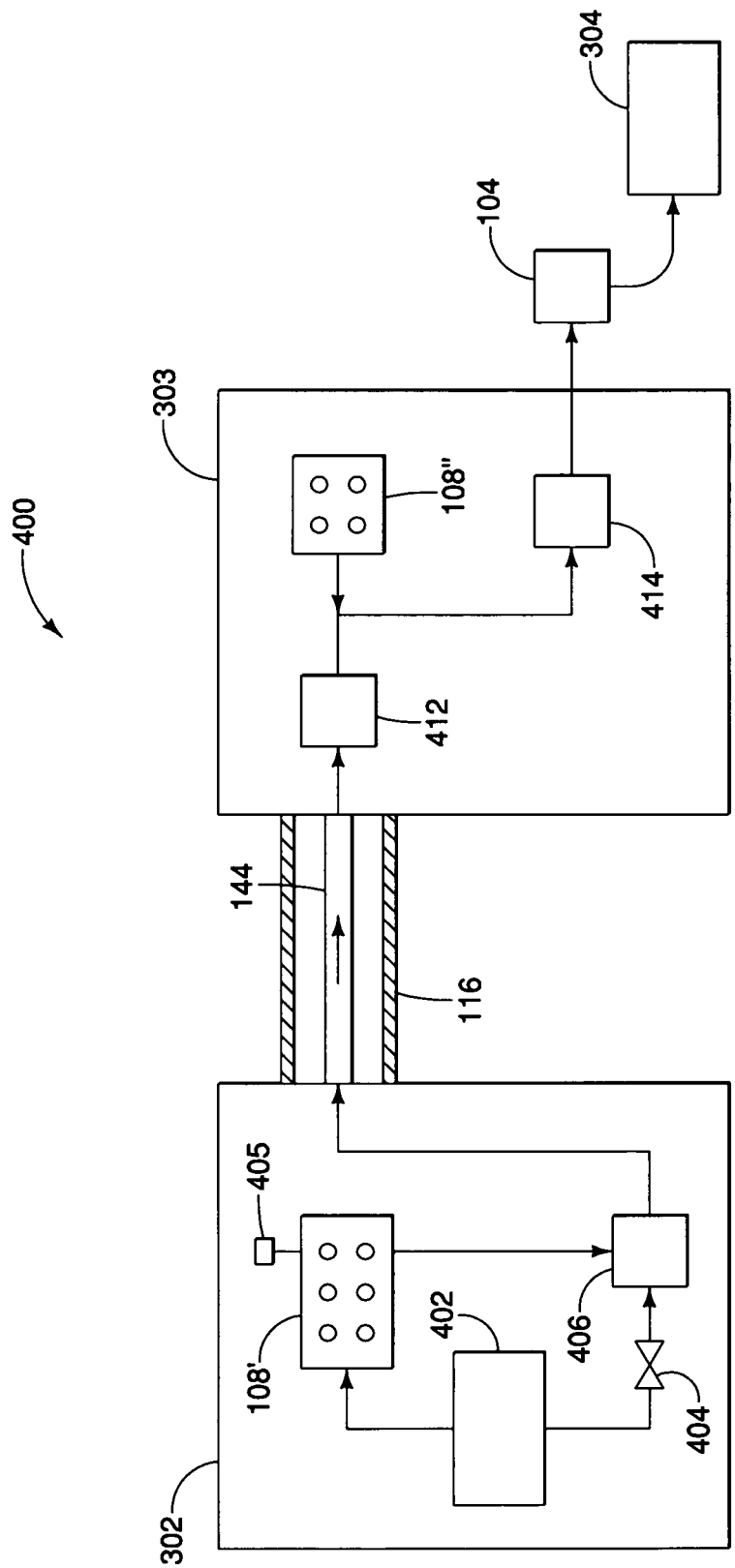
FIG. 12 is a schematic diagram depicting how collected storm water can be transferred from an urban core area to a suburban region to allow the water to be returned to an aquifer.

FIG. 12 is a schematic diagram of an urban regional runoff water management system 400, depicting how urban runoff water (and in particular, storm runoff water) can be collected, managed and distributed from the urban core (302, see FIG. 9) of an urban region (not numbered, but see 301, FIG. 9) to an associated suburban region (303, also FIG. 9) and outlying non-urban area 304 (per FIG. 9). The essential objective of the urban regional runoff water management system 400 is to collect water runoff from an urban core (302) which cannot be absorbed by the local terrain, and direct that water to the suburban region (303), and/or an outlying non-urban area 304, where the water can then be discharged in a useful manner (e.g., for aquifer replenishment). In FIG. 12, urban-core runoff water is collected from hardscapes 402 (such as streets, sidewalks, parking lots, etc.) and is directed to the runoff water collection and filtration system 108' (which can be as described above for the runoff water collection and filtration system 108 of FIGS. 10 and 11). During normal water runoff flow circumstances, runoff water from urban core hardscapes 402 is passed through the runoff water collection and filtration system 108', and then can be passed along to any of the water discharge destinations 104 (as described above with respect to FIG. 1). However, when a storm water collection tank (406) is provided in the urban core (302), then water from the runoff water collection and filtration system (108') can first be passed through the storm water collection tank 406 prior to be being passed to the water discharge destination 104. In this way the storm water collection tank (406) can provide capacitance within the system 400 in order to account for variations in water discharge from the runoff water collection and filtration system 108', and the capacity of the water discharge destination 104 to accommodate water from the runoff water collection and filtration system 108'. In addition to the possibility that the water discharge destination 104 may be incapable of accommodating the contemporaneous flow of water from the runoff water collection and filtration system 108', there is also the possibility that the runoff water collection and filtration system 108' is incapable of processing all of the runoff water from hardscapes 402, which can occur in the event of unusual rain events (such as a hurricane). Accordingly, in order to prevent overloading of the runoff water collection and filtration system 108', a relief valve 404 can be provided in order to allow excess runoff water to flow directly to the storm water collection tank 406. The relief valve 406 can be opened (manually or automatically) in response to a high-level indicator 405, which can indicate that the water collection and filtration system 108' is at maximum capacity. When the relief valve 404 is opened, then water from hardscapes 402 can flow directly to the storm water surge tank 406, without first passing through the runoff water collection and filtration system 108'. The relief valve 404 also serves to isolate the storm water surge tank 406 from the external environment, so that during periods when the relief valve 404 is closed, the storm water surge tank 406 is essentially sealed. When the storm water surge tank 406 is essentially sealed (by relief valve 404), foreign matter and pests (such as insects and vermin) cannot enter and foul the storm water surge tank 406.

Still referring to FIG. 12, collected runoff water from the urban core 302 can be directed to any of the discharge water destinations 104 (FIG. 1). As exemplarily depicted in FIG. 12, urban core (302) runoff water can be directed through a storm water accumulation tank 406 to any of the water destinations 104 via a collected storm water discharge line (144) which can be disposed within a larger primary pipeline 116. The larger primary pipeline 116 can be, for example, a sewage line, a storm water line or a water main. (See FIG. 6.) In this way the collected urban core runoff water from the urban core water collection and filtration system 108' can be directed outwards to a suburban region (303) where the water can be distributed to a number of different facilities (e.g., a water collection system 412, which can include tanks, canals, swales, bayous, etc.), additional water collection and filtration systems (108"), and water treatment facilities (414), prior to be ultimately discharged to a final water discharge destination 104.

The runoff water management system 400 of FIG. 12 can be integrated with pre-existing water management systems (and in particular, pre-existing storm water collection systems and tanks, and pre-existing sewage and water distribution systems), in order to reduce the cost of implementing the installation cost of the system 400, and to provide flexibility in directing the collection of urban runoff water to one or more destinations (104) depending on then-current conditions. The runoff water management system 400 can thus maximize the removal, treatment, and disposal of runoff water from urban areas, with the potential benefit of replenishing regional aquifers.

Figure 13:
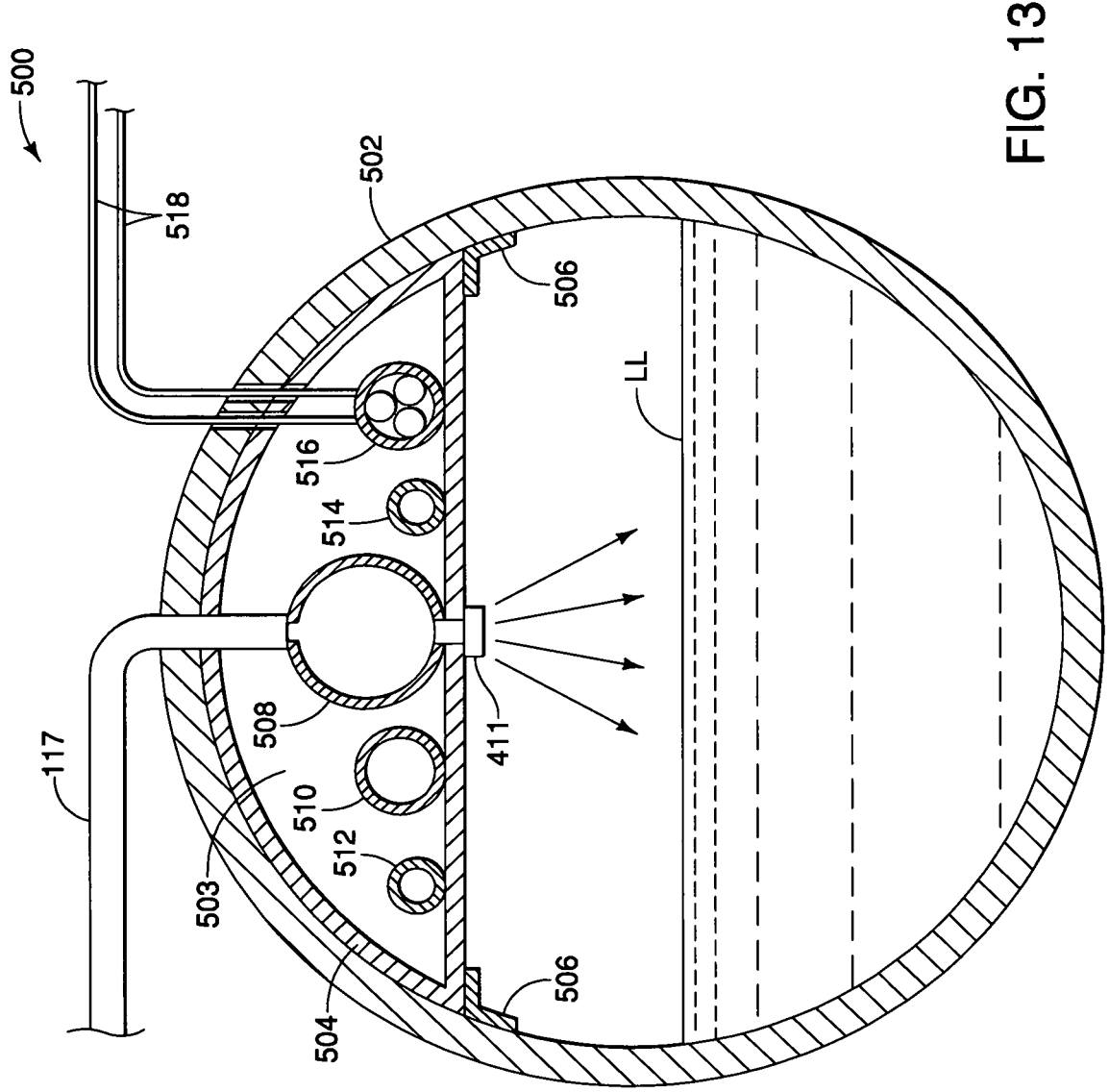
FIG. 13 is a side sectional view of a large diameter utility line used to house smaller diameter utility lines.

Distributed Utility System. A further embodiment provides for a distributed utility system. As indicated above with respect to FIG. 6, and the accompanying description, in the distributed utility system provided for herein a large diameter utility line (116), which can be part of a distributed water management system (e.g., 400, FIG. 12) can be used to house smaller diameter utility lines (e.g., 144, FIG. 6). That is, the smaller diameter utility line (or lines) can be distributed to different locals and regions using the larger diameter utility line by placing the smaller line (or lines) within the larger diameter utility line. Examples of large diameter utility lines that can be used for this purpose include storm water lines, sewage lines, and combined use storm water and sewage lines. The large diameter line can be any of the water resource lines 102, or water discharge lines 104, of FIG. 1. The large diameter utility line is typically characterized by a diameter of at least 3 feet (about 1 meter), but smaller diameter lines can be used for this purpose for localized distribution of utilities. Such large diameter utility lines are typically fabricated from concrete, cast iron, steel, fiberglass and plastic or other polymers. An advantage of using large diameter storm water lines and sewage lines for this embodiment is that they typically operate under atmospheric pressure, and thus present a low risk that their contents can intrude into the smaller diameter utility lines placed therein. A second advantage is that storm water and sewage lines are rarely filled to more than about 50% of capacity, and more typically to about 5% of capacity, thus leaving ample room therein for the smaller diameter utility lines. The smaller diameter utility lines will typically have an inside diameter of 6 inches or less, but larger diameter utility lines (e.g., 8 inches, 10 inches) can be placed within large diameter utility lines having diameters of 3 feet or more. One example of how smaller diameter utility lines can be housed within a large diameter utility line is depicted in FIG. 13, which will now be described. It will be appreciated that the utility service provided by the smaller diameter utility line disposed within the larger utility line will be a different utility service than is provided by the large diameter line.

FIG. 13 is an end sectional view of a large diameter utility line 502 which can be part of a distributed water management system (e.g., water system 400 of FIG. 12—note also line 116 in FIG. 12, which is also depicted in FIG. 6). The large diameter line 502 can thus be part of a distributed utility system (e.g., system 400, FIG. 12). The large diameter line 502 can be used to house one or more utility lines of smaller diameter. The large diameter line 502, along with the smaller utility lines, is thus a utility distribution system 500. The smaller diameter utility lines can be placed inside a utility housing 504 which is placed within the large diameter utility line 502. The utility housing 504 can be manufactured from a flexible material, such as plastic or rubber, to facilitate installation into a preexisting large diameter utility line. Access to an in-place large diameter line for installation of the housing 504 can be via a manhole. The utility housing 504 can also be described as a utility corridor. To further facilitate installation the utility housing 504 can be provided with periodic bellows segments (not shown) to provide additional flexure within the housing. The housing 504 can also be inserted into the large diameter line 502 in a collapsed or uninflated condition, and subsequently expanded and then secured to the inner wall of the large diameter line. The housing 504 can also be constructed in segments attached (and sealed) to one another. In another variation the housing 504 can be cast-in-place as part of the original large diameter line 502, or cast inside the large diameter line and then attached to the inner wall thereof. The utility housing 504 is preferably disposed within the upper section of the large diameter utility line 502, and thus above the liquid level "LL" in the large diameter line. The utility housing 504 is preferably structurally sufficient to withstand pressure from contents in the large diameter line when the line becomes filled. The utility housing 504 can be secured to the inside of the large diameter line 502 by means such as braces (506), adhesives, fasteners and hangers (not shown). The utility housing 504 is preferably a water tight housing such that if the liquid level "LL" within the large diameter line 502 rises to contact the bottom outside surface of the housing, liquid from the large diameter line will not intrude into the interior space 503 of the housing. Preferably the cross sectional area of the utility housing 504 is less than 25% of the cross sectional area of the large diameter utility line 502. However, the exact sizing of the utility housing 504 will depend on the anticipated service duty of the large diameter utility line 502. For example, if it is anticipated that the large diameter utility line 502 may fill to near capacity at least once a year, then a small utility housing (e.g., sized to 15% of the large diameter utility line) can be appropriate. The arrangement depicted in FIG. 13 (i.e., with a utility housing 504 disposed within a large diameter utility line 502) can be provided for already-in-place large diameter utility lines, as well as new installations. For new installations the housing 504 can be formed as part of the large diameter line 502 when the large diameter line is fabricated by extrusion, casting or fabrication (e.g., such as welding components together in order to fabricate the large diameter line). When the housing 504 is formed as part of the large diameter line 502, the large diameter line will achieve structural characteristics which can allow it to be used as a structural element spanning between support points. It will also be noted that a utility housing 504 is not necessary for the installation of smaller diameter utility lines inside a large diameter utility line, as is clear from FIG. 6.

With continuing reference to FIG. 13, one or more small diameter utility lines can be disposed within the utility housing 504 which is placed within the large diameter utility line 502. One such example of a small diameter utility line is the flush line 508, which is essentially similar to the flush line 144 described above with respect to FIG. 6. That is, the flush line 508 can be connected to a pressurized storm water distribution line 117 (as for example, from a storm water collection sump, such as sumps 112 of FIG. 1, and sumps labeled as 112 [etc]. in FIGS. 10 and 11). The flush line 508 can be provided with periodic flush nozzles 411 which penetrate the lower side of the utility housing 504. In this way the pressurized storm water (from line 117) can be used to flush accumulated solids and the like from the large diameter utility line 502. Note that line 117 can be any pressurized water line, and not necessarily from a storm water sump. For example, the flush line 117 can provide so-called grey-water from a wastewater treatment plant. An inspection camera and/or sensors (not shown) can also be provided inside of line 502 to determine when the line should be flushed. By periodically flushing solids from the large diameter line 502 the liquid level "LL" can be maintained at a lower level, and thus away from the utility housing 504. Other examples of small diameter utility lines that can be placed within the utility housing 504 include a potable water line 510, an electrical power line 512, a natural gas line 514, and a telecommunications utility line 516. (Telecommunication signal lines 518 from the telecommunications utility line 516 can be used to send and received local signals to telecommunication devices, as described more fully below with respect to FIG. 15.) Other examples of utility and service lines that can be placed inside of the large diameter pipe 502 include: (a) a pneumatic tube for message and small package delivery; (b) a wave guide tube for wireless transmission of telecommunication signals (such as in or near the millimeter wavelength); (c) a conduit for signal lines for control systems (e.g., the control manifold 150 of FIG. 7); and (d) an inflatable bladder (located outside of housing 504) to pressurize contents within the large diameter line 502 (for example, to increase the rate of liquid flow through the large diameter line). Of course, local regulations may limit the type of utilities that can be routed via the small diameter utility lines within the utility housing 504. For example, local regulations may require greater separation of electrical power lines 512 and natural gas lines 514 than can be provided within the housing 504, or may require potable water lines (510) to be separated from the contents of the large diameter utility line by more than just the lower wall of the housing 504. In order to prevent cross contamination of services from the various utility lines (including the large diameter line 502), the interior space 503 of the utility housing can be filled with a setting foam material (such as expanding polyurethane sealant) to prevent fluids, gases and electrical signals from being conducted from one utility line to another within the utility housing, as well as to provide thermal insulation for fluids within the smaller diameter lines. The small diameter utility lines (510, etc.) can be supported in the utility housing 504 by the lower wall (not numbered) of the housing, or hung from the upper curved surface of the housing. As indicated above, the utility line (508, 510, 512, 514, and/or 516, FIG. 13) disposed within the large diameter utility line 502 (which can be one of the water source supply lines 102 of FIG. 1, one of the water discharge lines 104 of FIG. 1, or the storm water collection line 116) provides a different utility service than the large diameter utility line. For example, when the smaller utility line 512 is an electrical power supply line, then the primary service of line 502 is something other than electrical power, such as storm water.

Figure 14:
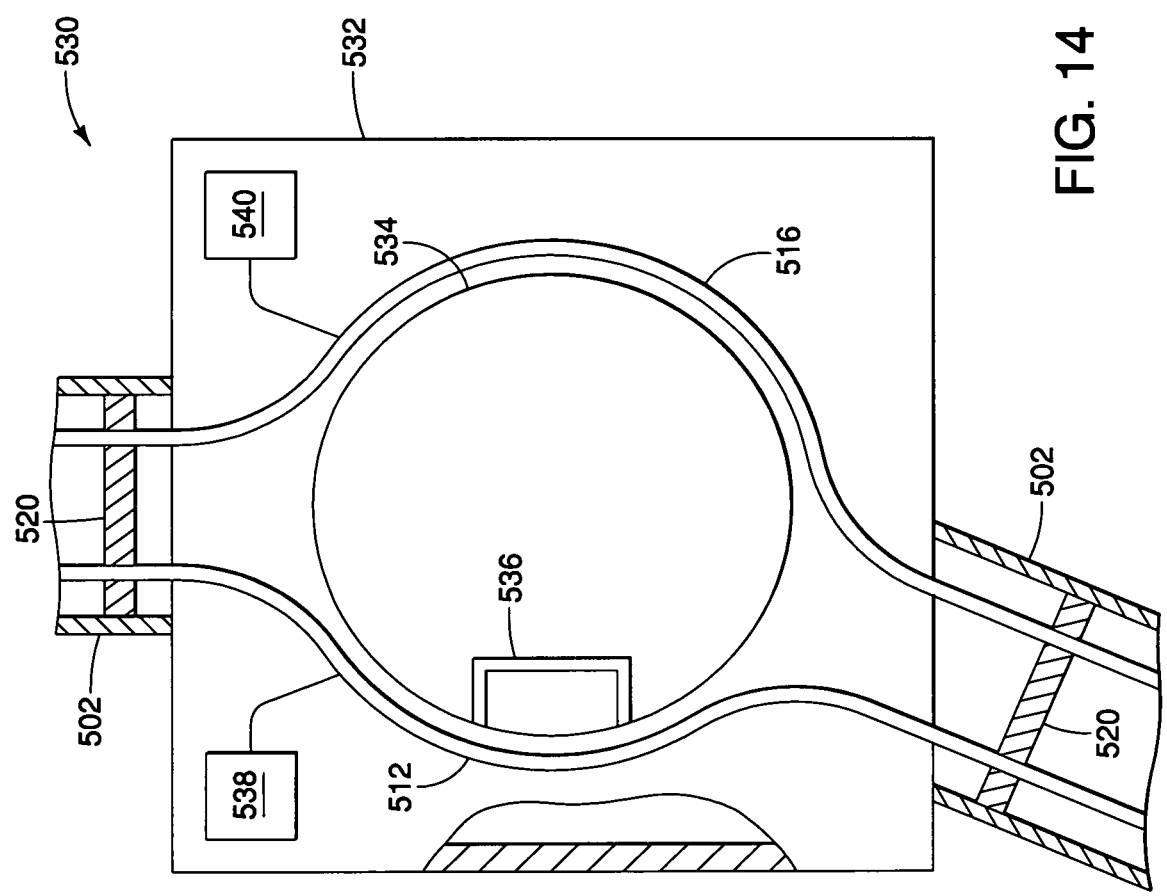
FIG. 14 is a plan view of a manhole depicting how the smaller diameter utility lines of FIG. 13 can be routed around the manhole.

Since large diameter utility lines (such as storm lines and sewage lines) are routinely provided with periodic access points (such as manholes) for maintenance and the like, such access points need to be accommodated in the distributed utility system 500 described above with respect to FIG. 13. Specifically, looking at FIG. 13, it will be appreciated that the utility housing 504 generally precludes access from above to the large diameter utility line 502 for cleaning and the like. This matter is addressed in FIG. 14, which is a plan view of an access facility 530 for a large diameter utility line 502. More specifically, the access facility 530 includes an access vault 532 which is placed in-line with the large diameter utility line 502. Such utility vaults 532 are known, and are usually prefabricated from concrete. The access vault 532 is accessible by a manhole opening 534 (typically covered by a manhole cover, not shown), and usually includes a ladder 536 to allow persons to enter the vault. The large diameter utility line 502 of FIG. 14 can be the same as depicted in FIG. 13—i.e., provided with a utility housing 504 (FIG. 13) which can house one or more smaller utility lines (512, 516, FIGS. 13 and 14). (The utility housing 504 of FIG. 13 is not depicted in FIG. 14.) As depicted in FIG. 14, the utility housing 504 (of FIG. 13) can be provided with end walls 520 which close off the interior space 503 (FIG. 13) of the housing 504 where the large diameter utility line 502 is intersected by the utility vault 532 of FIG. 14. At the end walls 520 (FIG. 14) of the utility housing 504 (FIG. 13) the small diameter utility lines (e.g., 512 and 516 of FIG. 14) can be routed through the end walls 520 and around the periphery of the access vault 532 in order to avoid interference with the manhole opening 534. (Note that in FIG. 14 lines 512 and 516 are not depicted by hidden lines as they should be, for sake of helping to visualize how they are routed within the access vault 532.) In this way the access opening 534 of the vault 532 is not blocked by the small diameter utility lines (512, 516). The portion of the lines (e.g., 512, 516) that are routed around the access opening 534 of the vault 532 can be provided as flexible conduit, or as specifically shaped portions of line. The periodic interruption of the utility housing 504 (FIG. 13) by the access vault 532 (FIG. 14) provides an opportunity for local access to be gained to the small diameter utility lines. For example, electrical power utility line 512 can provide electrical power to a junction box 538 so that electrical power can be routed to a user. Similarly, telecommunication utility line 516 can be connected to telecommunication transmission device 540 to enable the sending and receiving of signals from local telecommunication users. Examples of the telecommunication transmission device 540 can include an antenna, a signal junction box, a wireless repeater and a signal booster (or amplifier).

As can be appreciated from the above description, locations where large diameter utility lines (such as storm water lines and sewage lines) are provided are typically also locations where other utilities are needed—i.e., both types of utility lines (large diameter and small diameter) are almost always coincident to places of business and dwellings. Thus, economy of installation of small diameter utility lines can be achieved by placing such lines inside of large diameter utility lines, in the manner discussed above. The present disclosure thus provides for a distributed utility system, and a method for implementing the same, which includes placing small diameter utility lines within one or more large diameter utility lines which are part of a distributed water management system (as for example, systems 100, 300 and 400, described above with respect to respective FIGS. 1, 9 and 12).

Distributed Telecommunications System; Methods and System for Distributing Telecommunication Signals. As indicated above with respect to FIG. 13, large diameter utility lines can be used to facilitate distribution of telecommunication signal lines (e.g., 516). Telecommunication signal lines can include signal lines for cellular telephones and other cellular devices (which will be referred to generically herein as (cellular devices). A large amount of signals for cellular communications are currently wireless signals, transmitted by line-of-site from one antenna to another. Further, many cellular devices can receive cellular signals inside of buildings and homes directly from these cellular antennas. However, more recent cellular signals (generated as part of so-called fifth generation cellular networks, or "5G" cellular) use higher frequency radio waves than prior cellular signals—high-band 5G currently uses frequencies of 25-39 GHz, near the bottom of the millimeter wave band. These high-band 5G signal waves have a more limited range (distance) than signal waves used for prior generations of cellular signal broadcast. For example, whereas so-called fourth generation (4G) cellular signals can be transmitted from antenna to antenna over a range of miles, the wireless broadcast range of 5G cellular signals is typically no better than about 1000 feet (about 300 meters). Accordingly, 5G networks require many smaller cells than prior generations of cellular networks. (A "cell" is a geographic area in which wireless telecommunication signals are provided, and is limited in size by the bandwidth of the signals and the number of telecommunication end-user devices being serviced within the cell.) Further, high-band 5G wireless cellular signals have trouble passing through some types of walls and windows, and typically require line-of-sight transmission from transmitters to receivers (i.e., the 5G signals do not travel around corners of buildings and the like very well, as compared to prior generation cellular signals), and can be disrupted by atmospheric conditions (such as rain and dust). In order to address these shortcomings in high-frequency cellular networks (e.g., 5G and beyond), I have developed a system for distributing cellular signals using large diameter utility lines, as well as a system and method for distributing cellular telecommunication signals.

Figure 15:
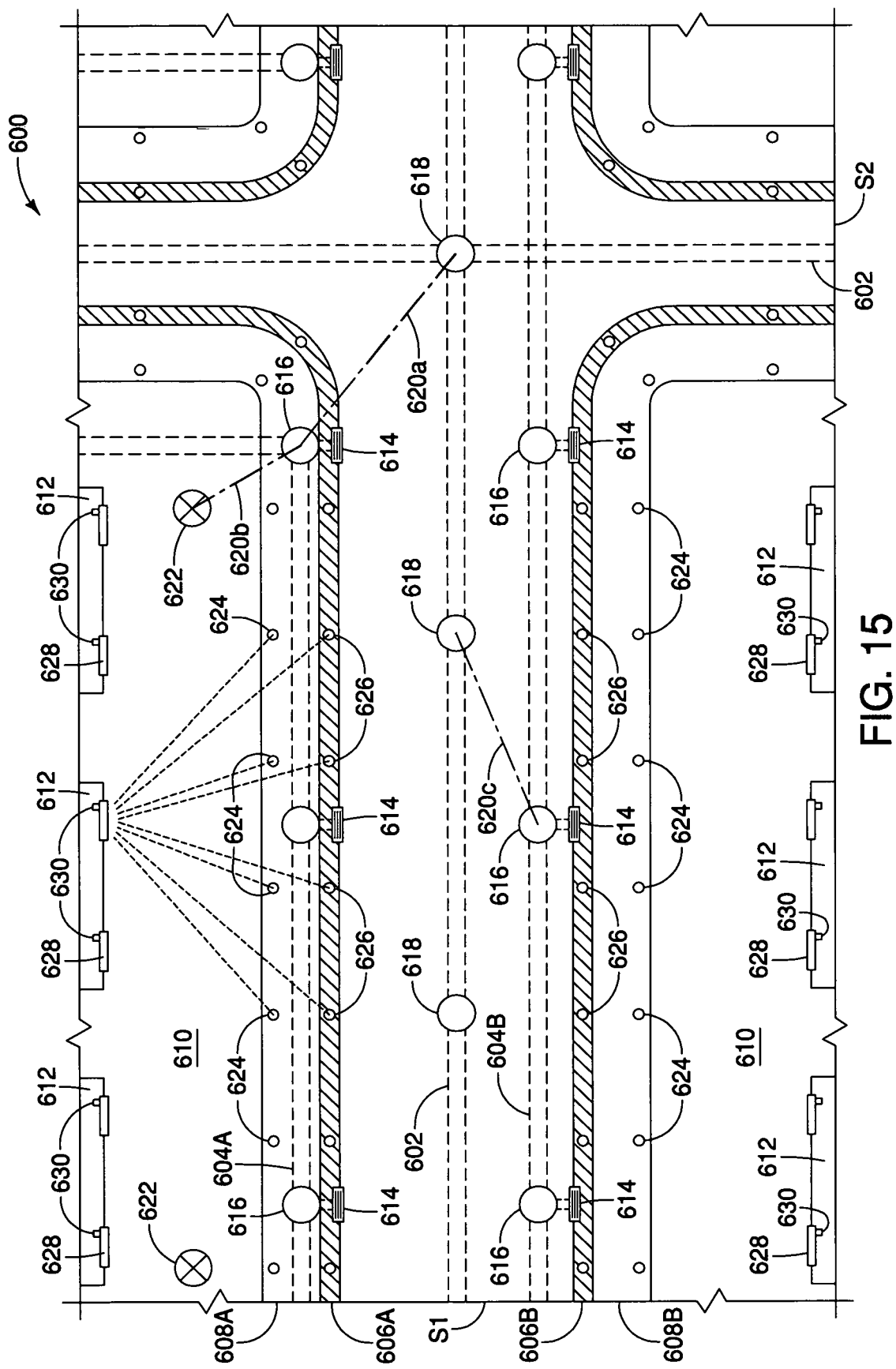
FIG. 15 is a plan view of a portion of a distributed utility system depicting how the system can be used to facilitate implementation of a telecommunication system.

Turning now to FIG. 15, a portion of a distributed utility system 600 depicting how the system can be used to facilitate implementation of a distributed telecommunication system is shown in plan view. The view in FIG. 15 depicts an urban area, including a first street "S1" which intersects a second street "S2" near the right side of the drawing figure. Street S1 is bordered by curbs 606A and 606B, which respectively define borders between the street and sidewalks 608A and 608B. The depicted urban area includes structures 612, which can be homes, apartments, businesses, etc. Structures 612 are set back from sidewalks 608A and 608B by setback spaces 610, which can be plazas, lawns, etc. Beneath streets S1 and S2 are large diameter septic sewage utility lines 602, which are approximately centered in the streets. The sewage utility lines 602 can be accessed by periodic access points, such as sewer line manholes 618, in the manner described above with respect to manhole 534 in FIG. 14. The distributed utility system 600 of FIG. 15 also includes a first storm water collection line (large diameter storm water utility line) 604A which is disposed beneath sidewalk 608A, and a second storm water collection line 604B which is disposed beneath street S1 proximate the curb 606B. The storm water utility lines 604A and 604B can receive storm water runoff via storm water drains 614 which are placed in respective curbs 606A and 606B. The storm water utility lines 604A and 604B can be accessed by periodic access points, such as storm water line manholes 616, in the manner described above with respect to manhole 534 in FIG. 14. The distributed utility system 600 of FIG. 15 can further include utility poles 622, which can support electrical lines, telephone lines, antennas and other utilities. Storm water utility lines 604A and 604B, and septic sewer lines 602, can be large diameter lines—typically 2 feet or more in diameter, and thus capable of housing smaller diameter utility lines in the manner depicted in FIG. 13 and described above. In particular, it is assumed in FIG. 15 that both of the storm utility lines 604A and 604B, and the septic sewer lines 602, house at least one telecommunications utility line in the manner of line 516 of FIG. 13. The telecommunications utility lines housed within the large diameter utility lines 604A, 604B and 602 are not depicted in FIG. 15 in order to avoid unnecessary clutter of the figure. More particularly, the telecommunications utility lines housed with the large diameter utility lines 604A, 604B and 602 in FIG. 15 can be optical fiber cables. Due to the small diameter of such optical fiber cables, such cables can be placed within larger diameter utility lines having a diameter of 12 inches, or even less. The telecommunications lines housed in the large diameter utility lines 604A, 604B and 602 can be placed in communication with one another by telecommunication links 620a and 620c, which can be either optical fibers or wireless transmission links (including signal wave tubes). Additionally, the system 600 can include telecommunications link 620b from the telecommunications line in the storm water manhole access 616 to utility pole 622 towards the right side of FIG. 15. While the distributed telecommunication system 600 of FIG. 15 depicts using both large diameter sewage utility lines 602, and large diameter storm water utility lines 604A and 604B, in practice the telecommunication utility line (e.g., 516, FIG. 13) will typically be placed in only one of the two types of large diameter lines in any local area.

As indicated above, the telecommunication utility lines (e.g., 516, FIG. 13) which can be housed within the large diameter utility lines 604A, 604B and 602 of FIG. 15 can be optical fiber cables. Optical fibers can transmit 5G cellular signals at the high-band rate of about 10 gigabits per second, but since cellular telecommunications at some point need to become wireless in order to reach wireless devices (such as cell phones), the telecommunications signal needs to be taken out of the optical fiber and sent to an antenna where it can be broadcast to a wireless cellular device. However, as discussed above, the range of transmission of 5G cellular signals is quite limited as compared to prior generations of cellular communication networks. In order to facilitate wireless transmission of the cellular communication signals from the telecommunication utility lines within the large diameter utility lines 604A and 604B, optical fibers (e.g., 518, FIG. 13) can be taken from the telecommunication utility line (516 in FIG. 13, not shown in FIG. 15) and routed to an antenna (such as antenna 540, FIG. 14) located at a manhole access (e.g., 616 or 618, FIG. 15), on a utility pole (622), or elsewhere. From there a wireless signal can be broadcast directly to a wireless telecommunication device (e.g., a portable cell phone) or to a wireless signal repeater/booster (generally, a wireless repeater). In order to achieve a high degree of coverage for 5G (and higher) cellular telecommunication signals, wireless repeaters 624 can be located in the sidewalks 608A and 608B, and wireless repeaters 626 can be located in the curbs 606A and 606B. Further, wireless repeaters 630 can be placed at windows 628 of structures 612, as well as at walls of the structures and on rooftops of the structures (not specifically shown in FIG. 15). Repeaters 630 can act as transceivers to bring a wireless cellular signal inside of the structures 612. Since the wireless repeaters (624, 626, 630) can require relatively low power (e.g., typically less than 1 watt for a low power repeater), the repeaters 624 in the sidewalks 608A and 608B, and the repeaters 626 in the curbs 606A and 606B, can be powered by solar cells and local batteries placed in or near the respective sidewalks and curbs. Further, since repeaters 630 are supported by or on buildings, they can have access to household alternating power (110-220 VAC), and thus can include signal boosting as well as signal repeating capability. The spacing of the repeaters 626 in the curbs 606A and 606B can be quite close—e.g., every 50 feet (about 16 meters) or less, which enable passing vehicles and pedestrians to maintain continuous wireless communication with a 5G network. The spacing of repeaters 624 in the sidewalks 608A and 608B can be similar to that for repeaters 630. The spacing of the repeaters/boosters 630 on the structures 612 will depend on the proximity to a broadcasting antenna and/or one or more of repeaters 624/624 (or another repeater 630 on a structure), as well as local factors (e.g., landscaping, architectural features, etc.).

The repeaters 624 and 626 (placed in respective sidewalks 608A and 608B for repeaters 624, and in curbs 606A and 606B for repeaters 626) can be supported in prefabricated repeater units (not specifically shown in FIG. 15) supporting one or more repeaters. For example, the prefabricated repeater unit can be 1.5-3 feet long (0.5 m-1 m), and about 9-18 inches wide, and typically will support only one repeater 630 (although more repeaters can be added to the unit, particularly if the unit is longer). The prefabricated repeater unit can be cast from plastic, glass, concrete, and other materials. The repeaters (e.g., 624, 626, FIG. 15) supported in the prefabricated unit can be powered by one or more photovoltaic solar cells (along with a capacitor for energy storage) which can also be cast into the prefabricated unit. Also (as described below) a portion of the telecommunication signal itself can be used to power the repeaters in the prefabricated repeater units. The prefabricated repeater units can be attached to the sidewalks or curbs using removable fasteners to allow the units to be replaced should they become damaged or inoperable. The prefabricated repeater units can be mounted flush with the sidewalk or curb (i.e., placed in a recess formed in the sidewalk or curb for the purpose of receiving the prefabricated unit), and can also be mounted as a raised unit that supplement or even replaces the curb or lane markers. The prefabricated repeater units can also be mounted in the gutter beside a curb, in a street, in center dividers along freeways, alongside rail lines, and in other locations where high-speed telecommunication signals are to be received by cellular devices moving past the repeater(s) supported within the prefabricated units. The use of such prefabricated repeater units alongside, or within, roads can facilitate the operation of autonomous vehicles, and can also provide real-time data from local environmental sensors (e.g., water level, wind speed, etc.). The prefabricated units can also support signal boosters when sufficient power is available to drive the amplifier circuit in the booster. (A booster, or amplifier, can be used to amplify wireless signals or signals in fiber optic cables.) An advantage of the telecommunications distribution system described above is that it can be easily upgraded as future generations of cellular communication protocols become available, which will generally require even closer spacing of repeaters and boosters in order to allow the signals to reach cellular devices. For example, the prefabricated repeater units described above, and which facilitate the 5G protocol, can easily be replaced with units having closer spacing of repeaters, e.g. when 6G becomes available.

In accordance with the above description pertaining to FIG. 15, the present disclosure further provides for a method for implementing a telecommunication signal distribution system, including the following steps: (a) disposing a telecommunications utility signal line within a large diameter utility line; (b) providing a means (such as an optical fiber or antenna) for extracting a telecommunications signal from the telecommunications utility signal line within the large diameter utility line; and (c) providing a means (such as an antenna or a repeater) for wirelessly transmitting the extracted telecommunications signal to one of a wireless telecommunications repeater or a wireless cellular device (such as a cell phone). The specific steps just described can be implemented using the systems described above with respect to FIGS. 13-15. Also, in the above-described steps, a "large diameter utility line" is intended to describe a utility line used primarily for a purpose other than telecommunications—e.g., a storm water line, a sewage line, etc.

The present disclosure also provides for a method for distributing telecommunication signals to end-users via roof-mounted plumbing vents. Most residential dwellings (including homes and high-rise apartment buildings) are equipped with open ended non-weather protected plumbing vents. Since such vents are open and generally straight-line conduits, they can be used as telecommunication signal conduits. That is, a first repeater and/or booster can be provided to the outside exposed (roof-side) top end of a utility vent, and then an optical fiber cable (or even a wireless signal) can be conveyed through the utility vent into an end-use location (e.g., home or business) at which a second repeater can broadcast the telecommunication signal into the structure (home, building, apartment, etc.). Such utility vents provide direct access to interior spaces (in buildings and homes) and can thus provide a conduit to move short wavelength telecommunication signals (in the range of 1 mm and less) into residences and businesses, thus avoiding the challenge of getting these short wavelength telecommunication signals through windows and walls. In one configuration a wireless telecommunication signal can be broadcast to an antenna on top of a structure (home or building), and then transmitted from the antenna to one or more repeaters located on utility vents (or specially provided telecom signal conduits) for subsequent transmission into the interior of the structure.

Because of the high transmission frequency of high-band telecommunications signals (typically 25-39 GHz in the case of 5G), the transmitted signal also carries a certain amount of useable power. Accordingly, a certain amount of the signal can be extracted and used as electrical power to drive devices such as the repeaters 630 described above. Power can also be extracted from the signals in fiber optic cables or wave tubes housed in large diameter utility lines and used to actuate control systems—i.e., the signal can carry both the information to a particular control system that it is to be actuated, as well as the energy to initiate the control process. Such signal-extracted energy (power) can thus be used in lieu of, or to supplement, a wired power supply, a solar powered power supply, and/or a battery power supply.

Subterranean Utility Corridors. The utility distribution system described above provides the beneficial function of placing large amounts of utility lines in subterranean utility corridors. This reduces visual clutter in urban areas, and also removes utility lines from potential damaging events (e.g., power lines downed by falling tree limbs, utility poles downed by hurricanes, vehicles hitting utility lines, etc.). Further, since municipalities typically own the storm water and sewage lines, streets, curbs and sidewalks, they can provide access to those lines and areas to private companies, thus simplifying administrative matters. For example, when installing cellular antennas and other equipment for a cellular network, current practice is for telecommunication companies to enter into hundreds (or even thousands) of separate agreements with private property owners in order to allow the telecommunication companies to place their equipment on private property. However, if significant portions of a telecommunication infrastructure system can be distributed by placing them in municipally-owned non-telecommunication infrastructure (e.g., in a subterranean utility corridor containing storm water pipes, or along sidewalks), then the number of agreements needed to install the network can be substantially reduced.

The preceding description has been presented only to illustrate and describe exemplary methods and apparatus of the present invention. It is not intended to be exhaustive or to limit the disclosure to any precise form disclosed. Many modifications and variations are possible in light of the above teaching. It is intended that the scope of the invention be defined by the following claims.

I claim:

1. A method for distributing a telecommunications signal, comprising:
    disposing a telecommunications utility signal line within a utility line used primarily for a purpose other than telecommunications, the telecommunication utility signal line carrying a telecommunications signal;
    providing one of an optical fiber or a first antenna to extract the telecommunications signal from the telecommunications utility signal line within the utility line; and
    providing at least one of a second antenna and a signal repeater configured to wirelessly transmit the extracted telecommunications signal to a wireless cellular device.

2. The method of claim 1 and wherein the step of disposing the telecommunications utility signal line within the utility line comprises disposing the telecommunications utility signal line within one or both of a storm water collection line and a septic sewage line.

3. The method of claim 1 and wherein the signal repeater is a first repeater, the method further comprising disposing a plurality of signal repeaters in a sidewalk to rebroadcast the extracted telecommunications signal to the wireless cellular device.

4. The method of claim 3 and wherein the plurality of signal repeaters disposed within the sidewalk are provided as prefabricated repeater units which include a photovoltaic solar cell to power the repeater.

5. The method of claim 1 and further comprising disposing an optical fiber within a structure utility vent, providing a second repeater in communication with the optical fiber at a rooftop location, providing a third repeater in communication with the optical fiber within the structure, and routing the telecommunications signal to the third repeater via the optical fiber and the second repeater.

* * * * *